US006922173B2

(12) United States Patent
Anderson

(10) Patent No.: US 6,922,173 B2
(45) Date of Patent: Jul. 26, 2005

(54) RECONFIGURABLE SCANNER AND RFID SYSTEM USING THE SCANNER

(76) Inventor: Theodore R. Anderson, 7 Martin Rd., Brookfield, MA (US) 01506

( * ) Notice: Subject to any disclaimer, the term of this patent is extended or adjusted under 35 U.S.C. 154(b) by 95 days.

(21) Appl. No.: 10/693,477

(22) Filed: Oct. 24, 2003

(65) Prior Publication Data
US 2004/0227682 A1 Nov. 18, 2004

Related U.S. Application Data

(63) Continuation-in-part of application No. 10/648,878, filed on Aug. 27, 2003, now Pat. No. 6,870,517, and a continuation-in-part of application No. 10/067,715, filed on Feb. 5, 2002, now Pat. No. 6,700,544.

(51) Int. Cl.[7] .......................... H01Q 1/26; H01Q 11/12; G08B 13/14
(52) U.S. Cl. ...................... 343/701; 343/741; 343/742; 343/866; 343/743; 343/868; 343/870; 340/572.1; 340/568.1; 340/825.35; 340/825.54; 340/825.49; 340/691.6
(58) Field of Search ................... 343/701, 866, 343/741–744, 867–868, 870; 340/572.1, 568.1, 825.35, 825.49, 825.54

(56) References Cited

U.S. PATENT DOCUMENTS

| 3,707,711 | A |   | 12/1972 | Cole |  |
|---|---|---|---|---|---|
| 3,852,755 | A |   | 12/1974 | Works et al. |  |
| 4,873,531 | A |   | 10/1989 | Heddebaut et al. |  |
| 5,811,786 | A | * | 9/1998 | Rockstein et al. | ..... 235/472.01 |
| 5,963,169 | A |   | 10/1999 | Anderson |  |
| 6,087,992 | A |   | 7/2000 | Anderson |  |
| 6,118,407 | A |   | 9/2000 | Anderson |  |
| 6,127,928 | A | * | 10/2000 | Issacman et al. | ........ 340/572.1 |
| 6,492,951 | B1 |   | 12/2002 | Harris et al. |  |
| 6,617,962 | B1 |   | 9/2003 | Horwitz et al. |  |
| 6,700,544 | B2 | * | 3/2004 | Anderson | ................... 343/701 |
| 6,844,821 | B2 | * | 1/2005 | Swartzel et al. | ......... 340/691.6 |

* cited by examiner

Primary Examiner—Shih-Chao Chen
Assistant Examiner—Chuc Tran
(74) Attorney, Agent, or Firm—Notaro & Michalos P.C.

(57) ABSTRACT

A scanner has plasma loop or plasma window antennas for selectively scanning for ID tags along distinct radials of the scanner. Scanner elements are made electromagnetically invisible to adjacent elements by removing power or lowering plasma densities so that the scanner elements do not interfere with its own operation. Activatable ID tags and a shipping container suitable for scanning with electromagnetic energy are also disclosed.

22 Claims, 14 Drawing Sheets

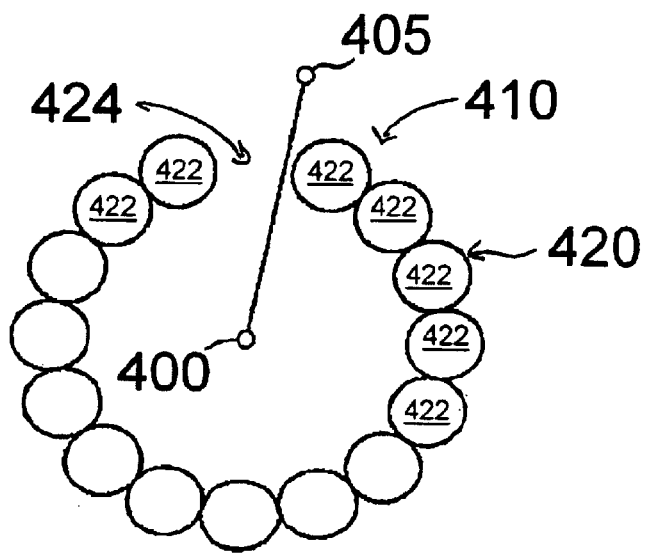
FIG. 14C
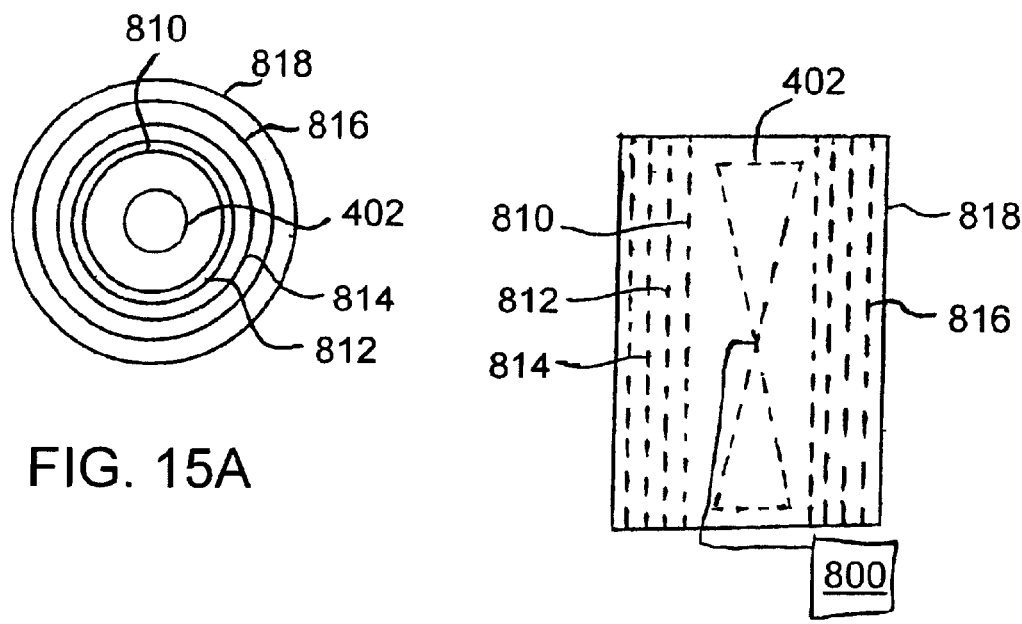
FIG. 15A
FIG. 15B

RECONFIGURABLE SCANNER AND RFID SYSTEM USING THE SCANNER

CROSS-REFERENCE TO RELATED APPLICATION

This application is a continuation-in-part of U.S. Pat. No. 6,700,544 application Ser. No. 10/067,715 filed Feb. 5, 2002, the entirety of which is hereby incorporated by reference. This application is also a continuation-in-part of U.S. Pat. No. 6,870,517 application Ser. No. 10/648,878 filed Aug. 27, 2003, the entirety of which is hereby incorporated by reference.

FIELD AND BACKGROUND OF THE INVENTION

The present invention relates generally to the field of RFID (radio frequency identification) and in particular to a new and useful plasma-based sensor array used to detect the presence of an interactive element resulting from interaction of antennas having variable conductive sections by magnetic induction and/or electromagnetic waves.

RFID systems have gained much popularity recently as a means for wireless tracking of individual objects for a variety of purposes. For example, some retailers have proposed using unique RFID tags attached to products they sell to be able to track each piece from the distribution warehouse to the store shelves, and potentially, to customer's home. RFID systems have applications in anti-theft, product marketing, intelligence gathering, and security systems, among others.

Near-field readers incorporating sensors and identification tags are generally known for use in scanning systems. As used herein, near fields exist at distances ranging from a fraction of a millimeter to a few miles, depending on frequency. The near field is defined as when the wavenumber times the distance of the range of the antenna is less than one. The far field is defined as when the wavenumber times the distance of the range of the antenna is greater than one. The wavenumber is $2\pi/\lambda$.

Near-field reader systems take advantage of magnetic field interference between a powered transceiver and a powered or passive object to detect the presence of the object by receiving a return signal from the object with the transceiver.

Presently, card and label near-field readers are formed by metal loops which read data in the near electromagnetic field. In the near-field situation, for a loop antenna, the electric field is effectively zero and only the magnetic field is present. Thus, near field loop antennas use mutual inductance between active and passive loop antennas to cause the active loop antenna to receive data from the passive loop antenna. That is, the magnetic flux from one loop antenna induces a current in a second loop antenna having properties dependent on the current and voltage in the first loop. The magnetic flux interaction and induced current can be used to transmit information between the loop antennas because of the dependency. The near-field loop antennas can be more correctly considered loop sensors or loop readers, since there is no electric field interaction between the active source and a passive loop.

RFID systems, in contrast, can be both near and far field devices. RFID systems generally have a longer range than most near-field systems, because they use radio frequencies, such as 900 MHz, 2.4 GHz, and, more recently, 5.8 GHz to transmit and receive information between sensor units and passive ID tags.

A problem with all metal antennas used in a sensing array is that even when they are not active, several antennas arranged in a multiple orientation array still create unavoidable mutual inductance and electromagnetic wave interferences between antennas. That is, even if the metal antenna sensors in an array are sequentially activated, they still cause mutual interference with other ones of the antennas. The interferences result in detuning of the antennas in the array, so that special considerations must be made when forming arrays of metal antennas.

In the case of inductive loop antennas, to optimize the strength of the mutual inductance field between an active loop sensor and a passive loop antenna, the antennas must be parallel to each other. If the antennas are perpendicular, the magnetic field is zero at the passive loop and there is no mutual induction. The strength of the magnetic field at the passive loop increases as the loops move from a perpendicular to a parallel orientation. For a device to effectively scan a region for a passive loop, a single loop must move through a variety of orientations. The range of effectiveness of an antenna is based on the orientation of the passive and active loops to each other and the diameter of the loop of the active sensor.

Patents describing scanning antenna systems using interaction between active and passive antennas include U.S. Pat. No. 3,707,711, which discloses an electronic surveillance system. The patent generally describes a type of electronic interrogation system having a transmitter for sending energy to a passive label, which processes the energy and retransmits the modified energy as a reply signal to a receiver. The system includes a passive antenna label attached to goods that interacts with transmitters, such as at a security gate, when it is in close proximity to the transmitters. The label has a circuit which processes the two distinct transmitted signals from two separate transmitters to produce a third distinct reply signal. A receiver picks up the reply signal and indicates that the label has passed the transmitters, such as by sounding an alarm.

U.S. Pat. No. 3,852,755 teaches a transponder which can be used as an identification tag in an interrogation system. An identification tag can be encoded using a diode circuit in which some diodes are disabled to produce a unique code. When the identification tag is interrogated by a transponder, energy from the transponder signal activates the electronic circuit in the tag and the code in the diode circuit is transmitted from the tag using dipole antennas. The transponder uses a range of frequencies to send a sufficiently strong signal to activate a nearby identification tag.

A vehicle identification transponder using high and low frequency transmissions is disclosed by U.S. Pat. No. 4,873,531. A transmitting antenna broadcasts both high and low frequency signals that are received through longitudinal slots in a transponder waveguide. Transverse pairs in the waveguide adjacent the longitudinal slots indicate a digital "1", while the absence of transverse pairs produces a digital "0". The high and low frequencies are radiated from the transverse pairs to high and low frequency receiving antennas. The transmitting and receiving antennas are fixed relative to each other and move with respect to the transponder.

U.S. Pat. No. 5,465,099 teaches a passive loop antenna used in a detection system. The antenna has a dipole for receiving signals, a diode for changing the frequency of the received signal and a loop antenna for transmitting the frequency-altered signal. The original transmission frequency is changed to a harmonic frequency by the diode.

As discussed above, near-field loop sensors or readers differ from far field loop antennas by the basic difference that in the near-field, the electric field is usually very small and the magnetic field of an electromagnetic radiant source is controlling, while in the far field, the interaction is via electromagnetic waves. As will be appreciated, the relationships between sources and receivers are different as well due to the different distances and fields which affect communication between them.

Plasma antennas are a type of antenna known for use in far field applications. Plasma antennas generally comprise a chamber in which a gas is ionized to form plasma. The plasma radiates at a frequency dictated by characteristics of the chamber and excitation energy, among other elements.

Plasma antennas and their far field applications are disclosed in patents like U.S. Pat. Nos. 5,963,169, 6,118,407 and 6,087,992 among others. Known applications using plasma antennas rely upon the characteristics of electromagnetic waves generated by the plasma antenna in far field situations, rather than magnetic fields in near-field conditions.

SUMMARY OF THE INVENTION

It is an object of the present invention to provide a scanning sensor array which eliminates interference between adjacent sensors in the array in both near-field and far-field application environments.

It is a further object of the invention to provide a scanning reader array which can be arranged to scan in multiple directions without concern for interference between array components.

Yet another object of the invention is to provide a scanning array composed of variable conductive elements.

A still further object of the invention is to provide an apparatus and method for scanning a volume for an interactive component containing a data using a reader with variable conductive elements.

Accordingly, an scanner using antennas is provided which effectively scans for items having readable data sources in controllable directions without interference between scanner components. The scanner transceives signals by magnetic induction or electromagnetic wave interaction along sequentially selected radials using antennas formed using variable conductive elements.

The scanner is provided in two embodiments. In a first embodiment, an array of plasma loop sensors are sequentially made active to scan a space to identify an interactive object comprising a data source based on mutual inductance or electromagnetic wave interaction of the scanning plasma reader with the data source. The data source can be an active or passive antenna of any type, including loop antennas. The plasma loop sensors are variable conductive elements, in that they are conducting only when powered.

The array of plasma loop sensors are connected to a power source, which may include a frequency switching circuit, and to a sensor circuit. The power source provides power to each of the plasma loop sensors as determined by a sequential switch circuit to make the loop sensors active in turn. The sensor circuit is used to interpret signals received from the data source by each plasma loop sensor while it is active.

One or more plasma loop readers can be arranged in arrays in different orientations to form a sensor and then sequentially activated to simulate a change in orientation of the sensor without any physical movement of the plasma loops in the array. Since the inactive plasma loop sensors are effectively electromagnetically invisible to the active plasma loop reader, there is no interference created between them. That is, so long as at least a section of the loop is formed by a plasma tube, the loop will be electromagnetically invisible to other sensor loops. When the loop has at least a section is plasma, the remainder may be another conductor, such as metal.

The plasma loops can be activated and deactivated in microseconds, so that very rapid switching among several plasma loops is possible. The plasma loop readers in the sensor can be arranged in a variety of configurations, including a sphere, a cylinder or other geometric shape. The terminals of each plasma loop reader in the configuration are connected to the power source via a switching circuit and to the sensor circuit.

In a further embodiment of the plasma loop readers, they may have several loops of different diameter joined at a common side. That is, there is a common area at the terminals where a portion of the circumference of each loop is the same. When a frequency switch is used in connection with the power source, the power frequency used to activate the plasma loops can be varied to change the frequency at which the plasma loop reader is active. The particular diameter loop in which the plasma is active in the plasma loop sensor is also changed by changing the active transmission frequency.

In yet another alternative of the plasma reader, the plasma loops are replaced by metal loops with sections of plasma loop which can be turned on and off. The plasma loop sections, or plasma switches, are sufficiently large so that when they are turned off, or made inactive, the metal loop is opened enough that it rendered electromagnetically invisible and no longer interferes with any surrounding active loop readers. The plasma loop sections are connected to the power source in the same manner as the full loops and can be switched in the same way.

In a still further alternative, plasma loop sections may be combined with metal loop sections and mechanical switches, such as relays and solid state devices. The metal loop sections may form up to a length of the loop which is effectively electromagnetically invisible when the switch is used to deactivate the loop.

It is intended that the sensor circuit connected to the antennas in the array will be capable of interpreting data received from existing types of passive loops commonly used in security devices and the like. The plasma loop sensor interacts with existing passive loops in the same manner as metal loop sensors, but does not suffer from detuning or interference from surrounding loop sensors.

In a second embodiment of the scanner, a steerable antenna is provided combining a transceiving antenna with one or more arrays of variable conductive elements for filtering, phase shifting, steering, polarizing, propagating and deflecting an incident signal at non-backscattering angles.

One embodiment of the steerable antenna comprises an antenna having a switchable electromagnetic shield of variably conductive elements for controllably opening a transmission window at selected radial angles positioned at an effective distance to intersect at least the transmission radials for the antenna. Preferably, the antenna is omnidirectional and the shield is concentric around the antenna to intersect all transmission radials for the antenna. The shield may also include switchable variable conductive elements for controlling an elevation angle of the transmission lobe passing through the window, so that the antenna is steerable on two axes.

The electromagnetic shield is formed by a cylindrical annular ring of switched variable conductive elements. In one embodiment, the shield is a ring of plasma tubes extending parallel with the omnidirectional antenna. Alternately, when transceiving in appropriate frequency ranges, the shield is a ring of photonic bandgap crystal elements or semiconductor elements. When the variable conductive elements are non-conducting or at low density in the case of plasma, so that the plasma frequency is lower than the incident transceived frequencies, the variable conductive elements are off and form a transmission window. The omnidirectional antenna can be a conventional metal dipole or other configuration antenna, a plasma antenna or an optical wavelength transmitter. Plasma antennas include nested plasma antennas and even stacked plasma arrays of the same type used to form the shield.

The transmission window is formed by either turning off power to the appropriate electromagnetic shield elements, or otherwise making the desired shield elements transparent to the transmitting antenna, such as by reducing plasma density below the threshhold needed to block transmission of an incident signal frequency. The shield elements are preferably rapidly switchable, so that the radial transmission direction of the antenna can be changed within microseconds, or faster by Perot-Etalon effects. The shield elements are selected for use with antennas broadcasting on a broad range of frequencies including microwave to millimeter range (kHz to GHz), TeraHertz, infrared and optical ranges.

An alternate embodiment of the shield utilizes a cylindrical array of switchable variable conductive elements to provide more selective control over where openings in the shield are formed. The cylindrical annular shield with the array surrounds an antenna. The elements forming the array are arranged in multiple rows and columns on a substrate. The substrate can be a planar sheet rolled into a cylinder shape. The variable conductive elements can be either switchable regions surrounding air or other dielectrics in fixed gaps or slots, so that the effective size of the fixed slots can be changed rapidly, or the elements can be formed as linear conductors, rectangles, stars, crosses or other geometric shapes of plasma tubes, photonic bandgap crystals or solid state semiconductors on the substrate. The substrate is preferably a dielectric, but may also be made from a conductive metal.

A more complex shield for the antenna has one or more stacked layers, with each layer being a switchable array of variable conductive elements. The layers are spaced within one wavelength of adjacent layers to ensure proper function. Each switchable array in the stack can be a filter, a polarizer or a phase shifter, a deflector, or a propagating antenna. The layers are combined to produce a particular effect, such as producing a steerable antenna transmitting only polarized signals in specific frequency bands.

Layers of annular rings, for example, can be stacked at distances corresponding to wavenumber times distance from the central antenna which correspond to transmission peaks for particular frequencies. By stacking several frequency-selective layers, a multi-frequency antenna is produced which is controllable to selectively transmit and/or receive each frequency along a particular radial of the antenna.

In a further embodiment of the invention, the scanner can be used to track a particular ID tag when one or both are moving, without physical re-orientation of the scanner. A central unit can be stationary or mobile and has a scanner with one of the two antenna configurations described which is controllable to scan along a specified radial from the scanner. The central unit includes circuits for determining when a connection is made between the scanner and ID tag and maintaining the connection while they move relative to each other. Once a connection is made, the electromagnetic shield of the satellite unit steerable antenna is activated to produce only a transmission window and radiation lobe along the radial axis needed to maintain the connection with the central unit. The steerable antenna shield on the central and each connected satellite unit is adjusted to compensate for their relative movement while maintaining the connections.

Conventional ID tags made of metal which are either passive or actively transmit can be used with the scanner of the invention. An ID tag having a variable conductive element forming the tag antenna is provided as well.

The ID tag with variable conductive element antenna can be an active transmitting or a passive transmitting antenna. Further, the ID tag can have an active variable conductive element or a passive variable conductive element. That is, the antenna is a plasma element which is either connected to an active transmitter, or does not transmit any information and is only sensed by electromagnetic interference. And, the plasma element can be normally powered and active and capable of being sensed by a scanner, or inactive and thus, electromagnetically invisible. The antenna can be normally inactive, but weakly or partially ionized and made active by exciting the plasma element to an active energy state is provided as well.

The inactive plasma element is excitable to an active state by an incident received signal. The plasma is energized and permits the ID tag to generate a detectable return signal with date or interference in response to the incident signal. The incident signal may be a scanning signal or other energizing signal. The plasma in the plasma element may be maintained in a weakly or weakly partially ionized state by a power source, such as a battery, laser, voltage source, a radiation source or radioactive source in a known manner, so that the plasma is more easily fully energized by the incident signal.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 14C is a diagram of an omnidirectional antenna surrounded by sixteen plasma tubes with fifteen energized;

FIG. 15A is a top plan view of a omnidirectional antenna used with layered arrays of the invention;

FIG. 15B is a side elevation view of the antenna configuration of FIG. 6B;

DESCRIPTION OF THE PREFERRED EMBODIMENTS

As used herein, plasma loop sensor and plasma loop reader are intended to both mean an active loop device having at least a section of plasma tube, as will be described further herein, when used in the near-field, and composed of only plasma tubes in far-field applications. The active loop device is an electro-magnetic transducer having a conductive plasma section. That is, the plasma loop reader or sensor can both generate a magnetic field or electromagnetic wave, depending on whether it is for near or far-field applications, and sense a corresponding interfering induction current or electromagnetic wave caused by a passive or active loop within range of the reader or sensor.

The terms plasma tube or plasma loops referring to plasma elements should not be taken as limiting on the geometric shape generally defined by the stated shape, except when the shape is essential to the function of the plasma element. Any linear dipole, traveling wave antenna, Yagi antenna, log periodic antenna, horn antenna, or aperture antenna can be used for the plasma loop antenna herein. Thus, the plasma element may be formed as a circular loop, a helix, a coil, an ellipse, a rectangle, a spiral or another shape suitable for emitting or receiving a signal.

Further, variable conductive element as used herein includes a plasma element, a photonic bandgap crystal, or a semiconductor, unless otherwise specified.

Figure 1A:
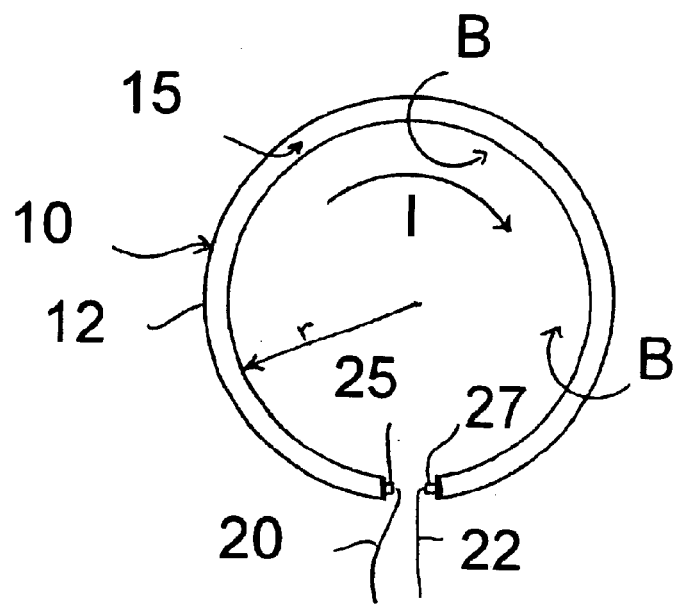
FIG. 1A is a front elevation view of a plasma loop antenna of the invention.

Referring now to the drawings, in which like reference numerals are used to refer to the same or similar elements, FIG. 1A shows a plasma loop sensor 10 primarily comprising a tube 12 having electrodes 25, 27 at each end. The tube 12 is bent into a circular loop. A pair of leads 20, 22 are attached to the electrodes 25, 27 for connecting the tube 12 to a power source (not shown in FIG. 1A).

The tube 12 of the plasma loop sensor 10 contains a gas 15 inside the plasma loop sensor 10. The gas 15 may be neon, xenon, argon or other noble gases, as well as mercury or sodium vapors, or other materials found to produce a suitable plasma. The gas 15 can be ionized to form a plasma in the tube 12 by applying energy to the gas 15 using any of several devices including electrodes 25, 27, inductive couplers, capacitive sleeves, lasers or RF heating.

When the gas 15 is ionized, a current I begins to flow between the electrodes 25, 27, which in turn generates a magnetic field having a magnetic flux B. The magnetic field is generated in a direction perpendicular to the plane of the loop antenna 10. The magnetic field is characteristic of the current I and voltage used to power the plasma in the tube 12.

The plasma loop sensor 10 optimal magnetic induction range is equal to the radius r of the loop. The plasma loop sensors 10 may be made any size as is practical and required by a particular application. For purposes of the invention herein, however, the preferred radius for the plasma loop antennas is between 0.5 cm and 100 cm. Further, it should be noted that although the optimal range of the plasma loop sensors 10 is limited by the radius of the loop, the sensors 10 are still effective across a wider range of distances.

The plasma loop sensors 10 may be switched on and off in a matter of 1–10 microseconds, with rapid rise and decay times, so that very rapid switching of the plasma loop readers 10 is possible.

The frequency of the ionization energy source also affects the plasma magnetic field radiation frequency. It is possible for the sensors 10 to radiate at frequencies ranging from 0.1 MHz into the Terahertz range.

Figure 1B:
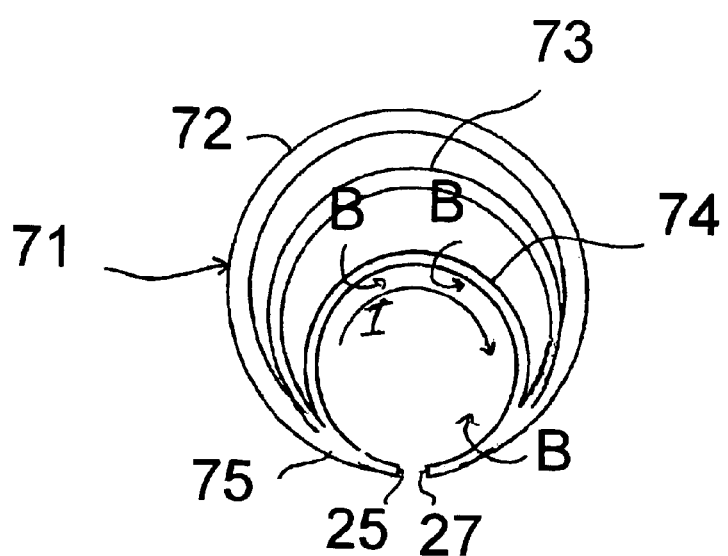
FIG. 1B is a front elevation view of an alternative plasma loop sensor according to the invention.

The plasma loop reader of FIG. 1B is a multiple loop plasma reader 71 having three different diameter tubes 72, 73, 74 with a common tangential side 75 and electrodes 25, 27. A gas inside the tubes can be ionized to different excitation levels depending on the energy applied at the electrodes 25, 27. The different ionization levels correspond to different radiant frequencies for the electro-magnetic fields generated by the plasma reader 71. Thus, the multiple loop plasma reader 71 can be used to generate multiple transmission frequencies or to receive on different frequencies from transmission by changing the energy supplied to the plasma loop reader 71.

Figure 2:
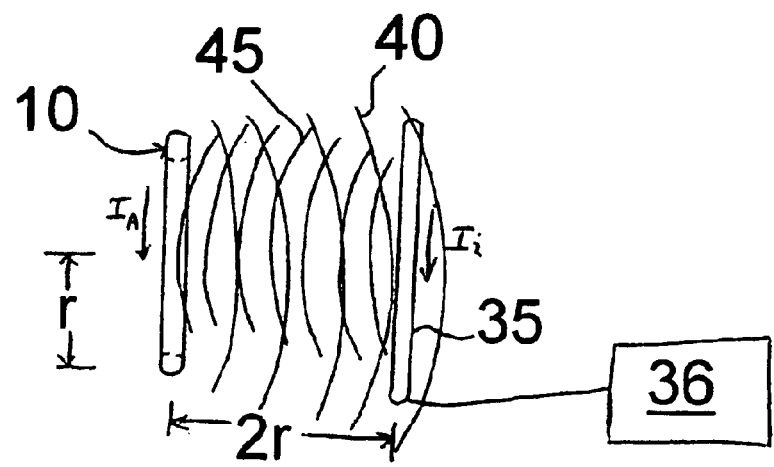
FIG. 2 is a side elevation view diagram of the magnetic field interaction between a plasma loop sensor of FIG. 1 and a passive loop.

FIG. 2 illustrates the interaction of a magnetic field 40 of a plasma loop sensor 10 with a passive metal loop 35. Plasma loop sensor 10 has a plasma current of $I_A$ which generates magnetic field 40 around the loop 10. The magnetic field 40 is sufficiently strong to at least effectively extend a distance of about twice the radius r of the loop 10 to passive loop 35. Magnetic field 40 induces a current $I_i$ in the passive loop 35.

Passive loop 35 includes a frequency changing circuit 36, which operates on induced current $I_i$ to alter the frequency of the received magnetic field and produce a frequency-changed response magnetic field. The frequency changing circuit 36 causes the induced current $I_i$ to have the altered frequency. The circuit 36 may be connected to the terminals of the passive loop 35 in a known manner. Passive loop 35 and frequency changing circuits 36 known in the prior art disclosed herein, for example, may be used for these components.

The induced current $I_I$, with a different frequency from the plasma current $I_A$, generates a response magnetic field 45 emanating from the passive loop 35. The response magnetic field 45 is also sufficiently strong so as to interact with the plasma loop sensor 10. As described further below, the plasma loop sensor 10 can also operate in a receive mode to detect response magnetic field 45. In the receive mode, the plasma loop sensor 10 has a second induced current that is different from plasma current $I_A$, with characteristics corresponding to the response magnetic field 45.

It should be noted that if the response magnetic field 45 is varied in response to a changing induced current $I_i$ controlled by the frequency changing circuit 36, that more complex communication is possible, such as transmission of an identifying code in addition to simply indicating the presence of the passive loop 35.

When the plasma loop sensor 10 and passive loop 35 too far apart to take advantage of the near-field situation and magnetic induction is insufficient to generate a response, the plasma loop sensor 10 can be used in a far-field type application instead. The plasma loop sensor 10 can be configured to transmit an electromagnetic wave, which generates a corresponding response similar to the magnetic induction response in the passive loop 35.

Thus, regardless of whether the interaction is only through magnetic induction or by electromagnetic wave, a single plasma loop sensor 10 can be used to detect the presence of a passive loop 35 and receive communications therefrom. However, the ability of the plasma loop sensor 10 to generate the induced current $I_i$ so that a response magnetic field is subsequently generated and received is dependent in part on the relative orientation of the plasma loop sensor 10 and passive loop 35 to each other. The loops 10, 35 must be oriented parallel to each other, as shown in FIG. 2, so that the interaction between the generated magnetic fields 40, 45 is maximum. As the relative orientation between the antennas 10, 35 changes from parallel to perpendicular, the field interaction with the antennas 10, 35 goes from maximum to zero.

To solve this problem, there are two primary solutions. One is to physically move the loops 10, 35 relative to each other to cover different orientations. The other is to create an array of several differently oriented plasma loop sensors 10 that can be sequentially activated to send and receive magnetic fields 40, 45.

In the latter case, plasma loop sensors 10 provide the benefit that they can be easily switched on and off rapidly in sequence. Further, plasma loop sensors 10 can be arranged in any type of sequentially-fired array without affecting adjacent ones of the plasma loop sensors 10 because when the gas 15 is not being ionized to form plasma, the inactive sensor 10 is electromagnetically invisible to another, active plasma loop sensor 10.

Figure 3:
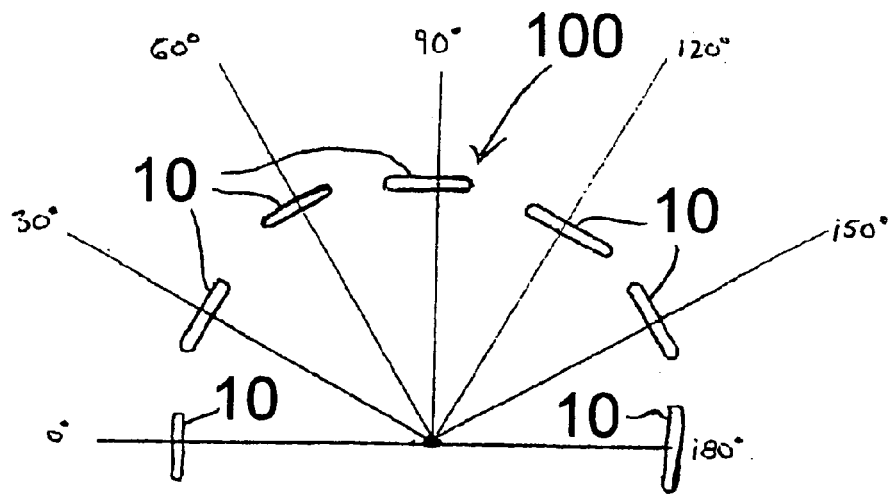
FIG. 3 is a diagram of an array of plasma loop readers at different orientations.

An example of an array 100 is shown in FIG. 3, in which seven plasma loop sensors 10 are arranged co-planar directed to different angles at 30° intervals. Although the plasma loop sensors 10 are shown arranged in an arc, this is only for purposes of illustrating the rotation to different angles and is not required. The plasma loop sensors 10 may be arranged co-linear as well, with each loop sensor 10 being rotated 30° from the facing of the previous loop sensor 10. Further, the angular rotation from one antenna to the next may be more or less than 30°, depending on the number of plasma loop sensors 10 in the array 100 and the desired effective range of each plasma loop sensor 10 based on both the expected distance and angular orientation offset from a passive loop 35.

Each plasma loop sensor 10 has its electrodes connected to a transmitting and receiving circuit (not shown in FIG. 3) with switching between modes and loop sensors 10, such as will be described in more detail below.

Figure 4:
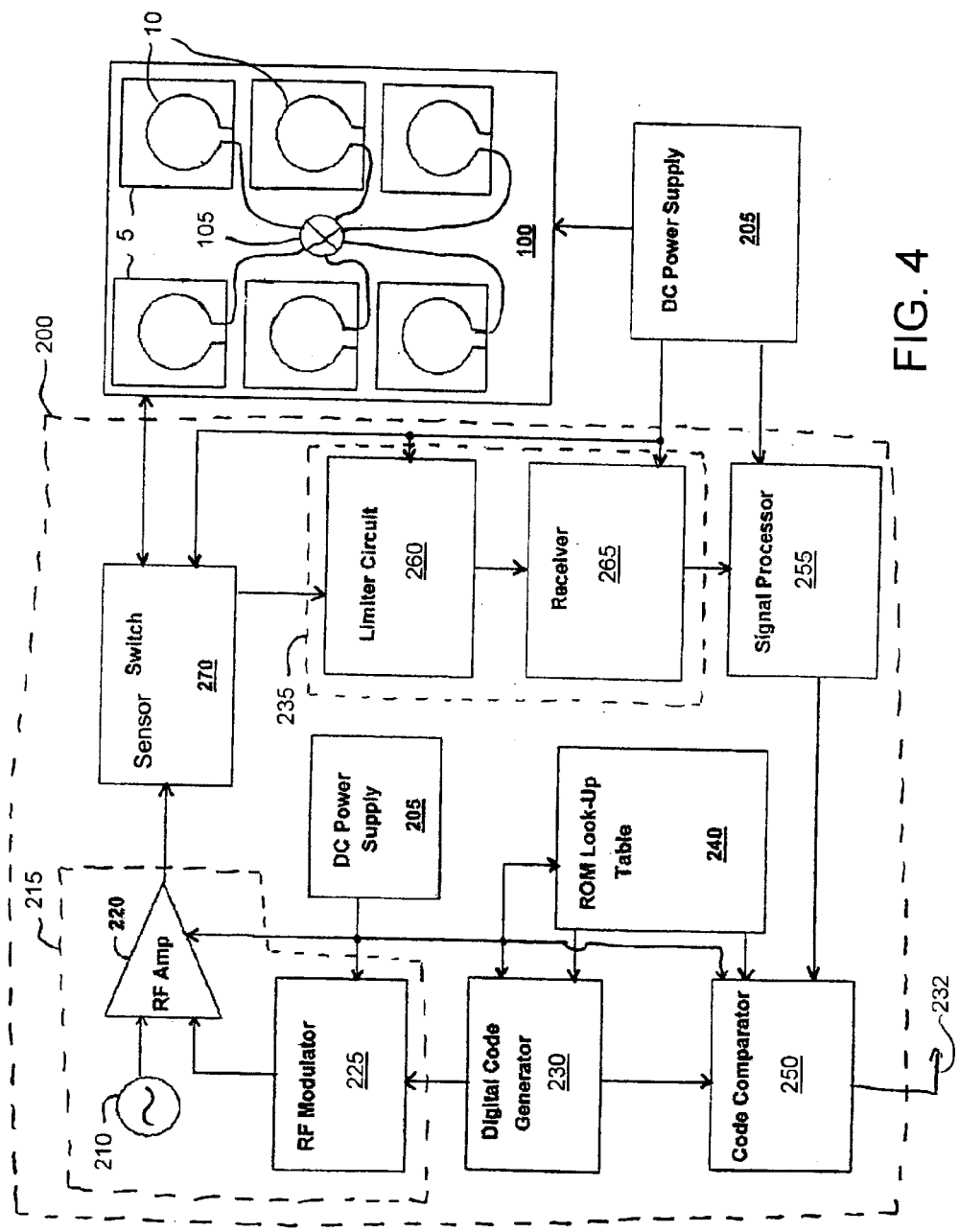
FIG. 4 is a schematic diagram of a transceiver circuit for use with a plasma sensor system.

FIG. 4 diagrams one possible transceiver circuit 200 for use with an array 100 of plasma loop antennas 10 mounted in substrates 5 for protection during use. A DC power supply 205 is connected to a mixer 210 and an analog to digital converter 230. The power supply 205 is preferably one which provides standard digital and other voltages needed for operating the circuit components.

The transmit segment 215 of the circuit 200 includes RF CW oscillator 210 having its output connected to an RF amplifier 220. The RF amplifier 220 combines a CW signal from the oscillator 210 with a modulated signal from a connected RF modulator 225 and generates an amplified pulse modulated (PCM) signal having information for transmitting with the plasma loop sensors 10. The PCM signal is sent to the plasma loop sensor array 100 for energizing an active one of the plasma loop sensors 10 and creating a magnetic field and electromagnetic wave.

The PCM signal may be varied using a digital code generator 230 connected to the RF modulator to produce different RF modulated signals. The varying PCM signal in turn provides a time-varying signal to the active plasma loop sensor 10 and results in a time-varying magnetic field and electromagnetic wave being produced by the plasma in the active plasma loop sensor 10. The digital code generator 230 provides a code word from a look-up table stored in ROM 240. Changing the code word causes the RF modulator to produce different RF modulated signals.

The RF amplifier 220 outputs the PCM signal to sensor switch 270 connected to plasma loop sensor array 100. Sensor switch 270 controls switching between the transmit 215 and receive 235 circuit segments. Preferably, the sensor switch 270 cyclically alternates between transmit and receive modes.

A switch 105 within array 100 is used to sequentially switch power to the several plasma loop sensors 10 in array 100. Only one plasma loop sensor 10 is made active at one time; the remaining plasma loop sensors 10 do not receive any power so that they are effectively rendered electromagnetically invisible to the active sensor 10 and do not detune the active sensor 10. While a plasma loop sensor 10 is active, the sensor switch 270 provides at least one transmit/receive cycle for the active plasma loop sensor 10.

After the sensor switch 270 permits a transmit phase in which the active plasma loop sensor 10 generates a magnetic field and electromagnetic wave, the sensor switch 270 changes to connect the active plasma loop sensor 10 to a receive segment 235 of the transceiver circuit 200.

The receive segment 235 includes a limiter circuit 260 for ensuring the received signal from the array is scaled within the operating range of a receiver 265. The limiter circuit 260 protects the receiver 265 from over-voltage instances in the received signals. The receiver then demodulates a coded reply RF PCM signal, which can be generated by interaction of the active plasma loop sensor 10 with a passive loop within the near-field range. If necessary, the receiver can also amplify the received RF PCM signal to ensure proper decoding.

The transceiver circuit 200 includes components for interpreting the received signal. The demodulated coded reply signal is sent from the receiver 265 to a signal processor 255. The signal processor 255 conditions the coded reply signal for input into a code comparator 250. When the conditioned reply signal is input at the code comparator 250, the coded reply is compared to known or expected replies stored in a look-up table stored in ROM.

The result obtained by the code comparator 250 is sent to an output 232. The result may be information received from the passive loop or it may be a null if no passive loop was detected during the transmit/receive cycle.

The output 232 can be connected to any device capable of using the digital signal from the A/D converter. For example, in grocery scanning system, the output 232 may be connected to a cash register to provide price and item information received from a scanned object in a grocery bag.

Figure 5A:
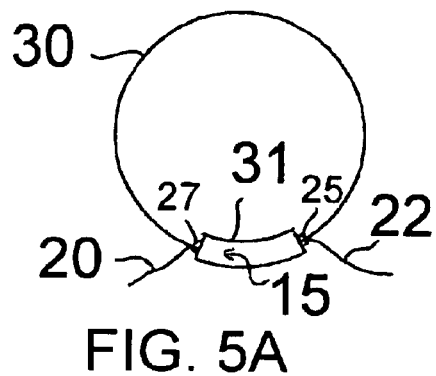
FIG. 5A is a front elevation view of a metal loop sensor with a plasma section.
Figure 5B:
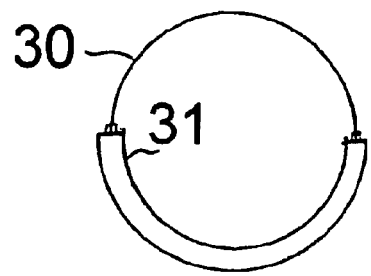
FIG. 5B is a front elevation view of an alternative embodiment of the metal loop sensor and plasma section of FIG. 5A.
Figure 5C:
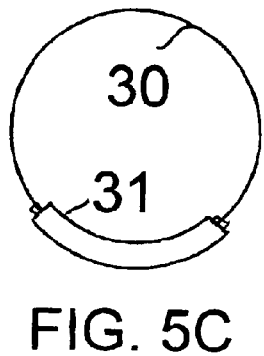
FIG. 5C is a front elevation view of a second alternative embodiment of the metal loop sensor and plasma section of FIG. 5A.

While loop sensors wholly composed of plasma tubes are preferred for use, FIGS. 5A–5C illustrate metal loop sensors 30 having plasma sections 31 which are electromagnetically equivalent to the plasma loop sensors 10 described above. The metal loop sensors 30 with plasma sections 31 are also magnetically invisible to adjacent loops when the plasma sections 31 are deactivated. That is, the plasma sections 310 are sufficiently long that when the ionizing energy is removed from the electrode terminals 25, 27, the loop circuit is broken so that a magnetic field will not generate a current in the metal loop 30. Since current cannot flow through the loop 30 except when the gas 15 is ionized to form plasma, the metal loop sensor 30 also appears electromagnetically invisible and does not cause detuning of surrounding sensors 10, 30 when it is inactive.

The plasma sections 31 act like switches for the metal loop sensors 30 to activate and deactivate them in the same manner as the plasma loop sensors 10 are activated and deactivated. When power is supplied to the plasma section 31 through leads 20, 22 and electrodes 25, 27, the metal loop sensor 30 is activated and transmits a magnetic field which can interact with other adjacent loop sensors. The metal loop sensors 30 can be connected to a circuit such as that shown in FIG. 4 in the same manner as the plasma loop sensors 10. Arrays of the metal loop sensors 30 can be connected, oriented and sequentially switched using the plasma sections 31 in the same manner as the plasma loop sensors 10 described herein as well.

The plasma section 31 can be as short as a 1° arc segment of the metal loop sensor 30, up to the entire circumference, less a gap for electrodes, so that it is the same as plasma loop sensor 10. However, when the metal loop sensor 30 embodiment of the loop sensors 10 is used, it is preferred that the plasma section 31 is an arcuate segment between about 1° and 10° long.

Figure 5D:
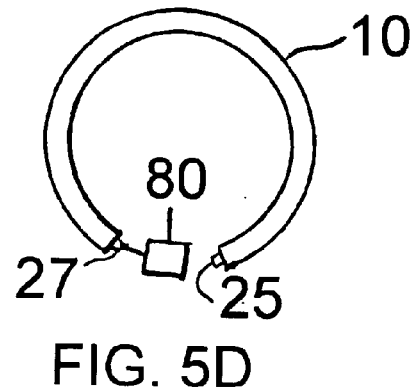
FIG. 5D is a front elevation view of a third alternate embodiment of a loop having metal and plasma sections and a switch.

In FIG. 5D, a further alternative loop 10 structure is provided in which a plasma loop 10 has a switch 80 in series. The switch 80 may be an electromechanical relay switch, a solid state switch or other similar switch that is electrically changeable between conducting and non-conducting positions.

Figure 8:
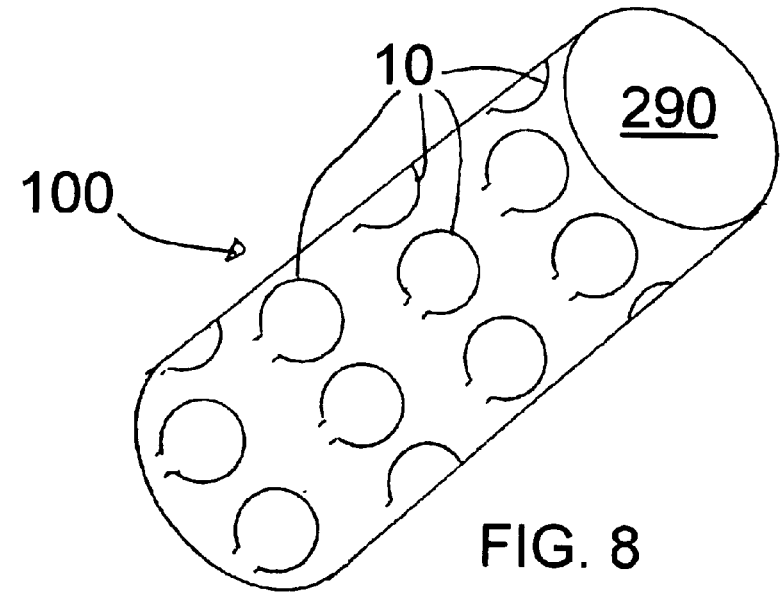
FIG. 8 is a front perspective view of a cylindrical substrate holding an array of plasma loop sensors.
Figure 6:
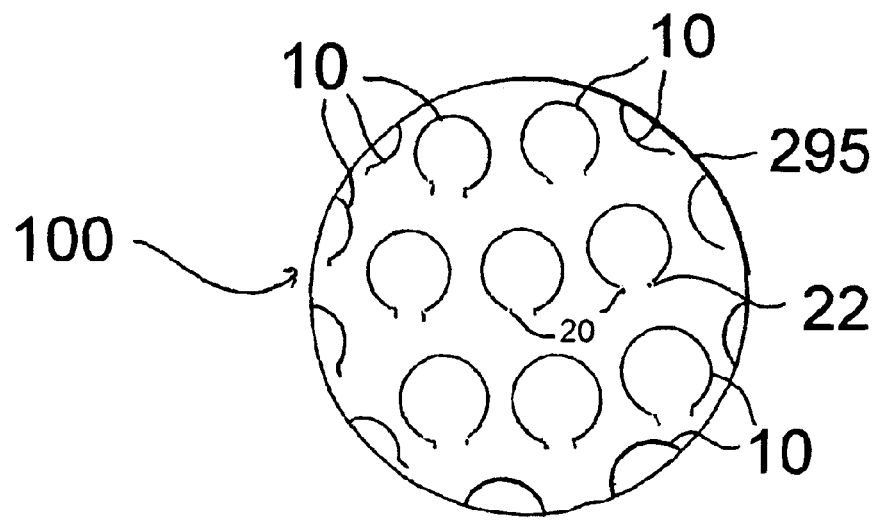
FIG. 6 is a front perspective view of an array of plasma loop readers mounted in a spherical substrate.
Figure 7:
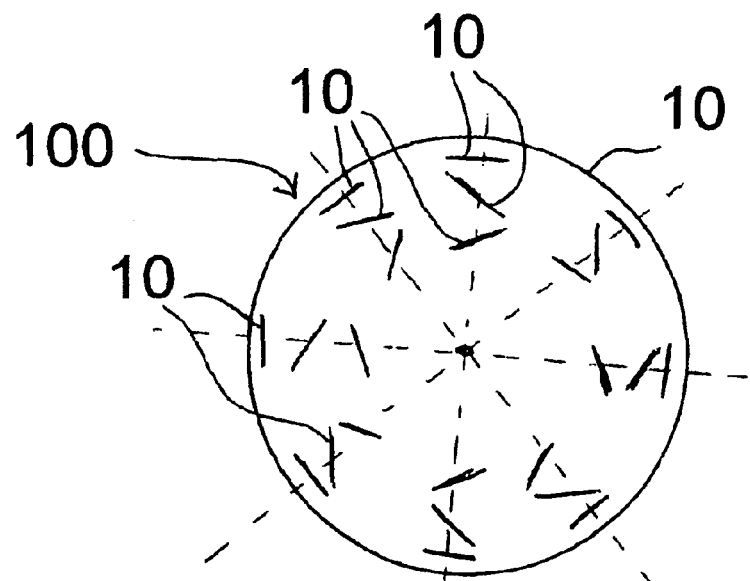
FIG. 7 is a sectional top plan view of an alternative embodiment of the array of FIG. 6 taken across an equator of the spherical substrate.

FIGS. 6–8 illustrate scanning arrays 100 of plasma loop readers 10 supported in rigid substrates 290, 295.

In FIG. 6, a spherical non-magnetic substrate 295 supports an array 100 of plasma loop readers 10 on its surface. The substrate 295 is selected so that it does not interfere with the magnetic fields and electrical properties of the plasma loop sensors 10. Although non-magnetic substrates are preferred, it should be understood that ferrite materials may be used for the substrate as well.

The terminal leads 20, 22 of each plasma loop sensor 10 are connected to a switching transceiver (not shown in FIG. 6), such as one like that illustrated in FIG. 4, so that each plasma loop sensor 10 may be sequentially activated.

The plasma loop sensors 10 are arranged around the surface of the sphere oriented along many different radii of the sphere. The orientation of the plasma loop sensors 10 allows sequential scanning of a broad range of angles for corresponding passive loops 35 within the effective range of the plasma loop sensors 10. Since the orientations of the plasma loop sensors 10 varies across the surface of the spherical substrate 295, the substrate itself does not need to rotate. The sequential activation of the plasma loop sensors 10 virtually rotates the scanning angle without moving the substrate 295. Clearly, when the substrate 295 is spherical, a wide range of angles can be scanned for corresponding receiving loops in objects carrying the receiving loops.

FIG. 7 illustrates another embodiment of the spherical substrate 295 having an array 100 of plasma loop readers 10 embedded within the thickness of the substrate 295. The substrate 295 is shown with the top half of the sphere removed. As can be seen, the plasma loop readers 10 are oriented at different angles along each of several axes of the sphere. The orientations of the plasma loop readers 10 are selected to maximize the scanning coverage of the array 100. As in FIG. 6, the plasma loop readers 10 are each connected to a switch and transceiver circuit (not shown in FIG. 7) for sequential activation to ensure there is no electromagnetic interference between plasma loop readers 10 in the array 100.

In FIG. 8, a cylindrical substrate 290 has an array of plasma loop sensors 10 arranged around the surface of the substrate 290. The substrate is selected to have the same properties as the spherical substrate 295. The cylindrical substrate 290 scans for corresponding receiving passive loops located around the axis of the cylinder within the effective range of the plasma loop sensors 10. The cylindrical substrate 290 with the plasma loop sensors 10 mounted only on the surface is limited compared to the spherical substrate 295 in that only two axes of receiving passive loop orientations can be fully scanned versus three.

However, if the plasma loop sensors 10 are embedded in a cylindrical substrate 290 around the surface and oriented rotated about the cylinder radial axis to different angles, then all three axes can be scanned with a sensor array using the cylindrical substrate 290. That is, passive loops oriented perpendicular to the longitudinal axis of the cylindrical substrate 290 could be detected as well.

Arrays 100 of the plasma loop readers 10 can be used in a variety of scanning applications to detect a receiving passive loop, such as the one shown in FIG. 2.

Figure 9:
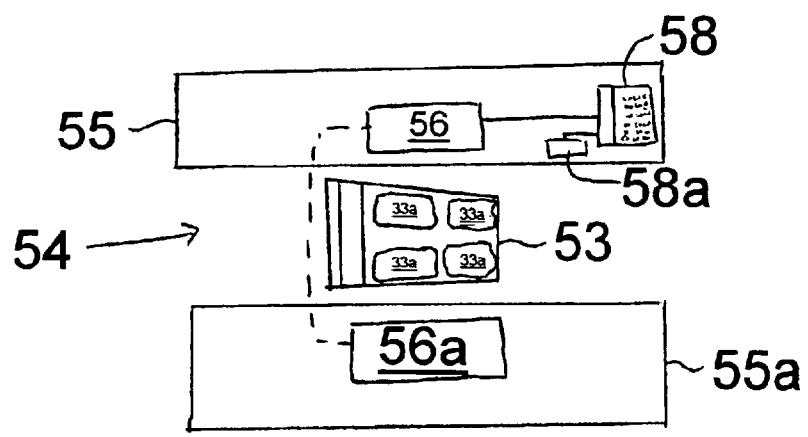
FIG. 9 is a top plan view diagram of a grocery or department store checkout using a plasma loop sensor array of the invention.
Figure 10:
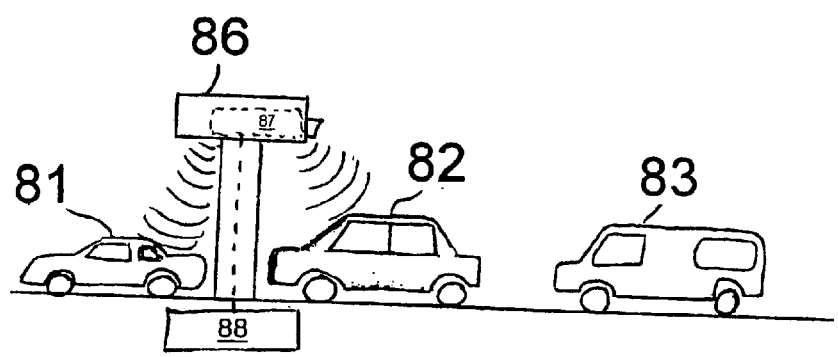
FIG. 10 is a side elevation view of a diagram of a toll collection system using plasma loop arrays according to the invention.
Figure 11:
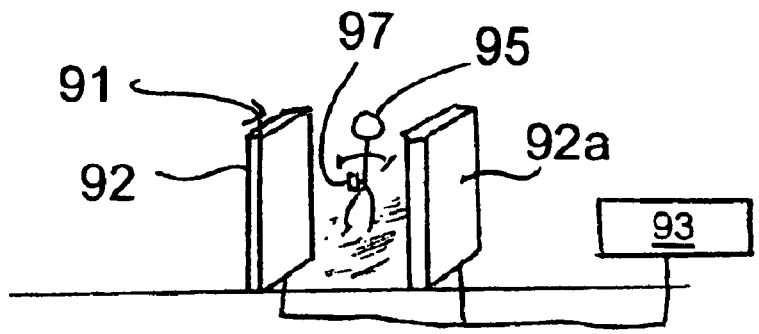
FIG. 11 is a front perspective view diagram of a security gate system using a plasma loop scanning array according to the invention.

FIGS. 9–11 depict different scanning applications for arrays of the plasma loop sensors which take advantage of the fact that the array itself does not need to move physically to scan a wide range of angles, as discussed above.

In FIG. 9, a checkout lane 54 of a grocery or department store is shown having a cart 53 containing packages or bags 33a containing goods. Depending on the circumstances, either the packages or the goods are each encoded with a unique receiving passive loop (not shown). The lane 54 has two counters 55, 55a each having a plasma loop scanner 56, 56a located vertically at about the level of the bags 33a in the cart 53. Each plasma loop scanner includes an array of plasma loop sensors and a switching and transceiver circuit for sequentially activating each sensor in the array to query the goods in the bags 33a. The outputs of the transceiver circuits are connected to a cash register 58 for ringing up each unique goods detected in the cart 53 and completing the sale.

The scanners 56, 56a use an array such as the spherical or cylindrical arrays of FIGS. 6–8, or a semi-sphere array which scans the 180° in the lane 54. The semi-sphere array can be created by cutting the spherical substrate 295 in half and using only one half. The arrays are connected to a transceiver circuit like that of FIG. 4, or another circuit having a similar function.

When the transceiver of FIG. 4 is used, the ROM 240 provides a look-up table for identifying each uniquely coded object having a receiving passive loop that is detected by the scanners 56, 56a. Either of the cash register 58 or the scanners 56, 56a includes a logic circuit or computer for determining when the same receiving passive loop is detected by a subsequently activated plasma loop sensor in the array. The logic circuit or computer ignores the duplicate detection, while passing newly detected goods to the cash register 58 for pricing and totaling the purchase.

The scanner system of FIG. 9 provides a checkout line in which it is unnecessary for a customer to unload the cart 53 for a clerk to individually scan items in the bags 33a. The contents of the bags 33a can be determined solely by using the scanners 56, 56a. Further, depending on the effective range of the arrays in the scanners 56, 56a, only one of the scanners may be needed. Where the distance across the lane 54 is too great for a scanner 56 from one side to effectively detect receiving sensors on the far side of the lane, the second scanner 56a can be used as well.

Used in combination with a known debit and credit card terminal 58a connected to the cash register 58, a single clerk can effectively manage several checkout lanes 54 at once, since the checkout is fully automated except when cash or a check is used as payment. Consumers can bag their goods as they shop since it is not necessary to remove the items for checkout, further eliminating wasted checkout time.

FIG. 10 illustrates a toll collection system in which a toll gate 86 is equipped with a scanner 87 connected to a transaction manager 88. The scanner 87 includes an array of plasma loop readers 10, 30 as in the checkout lane scanners 56, 56a. The array is used to rapidly sequentially scan for receiving passive loops oriented in a range of angles on cars 81, 82, 83 passing underneath the toll gate 86.

Each car 81–83 that will use the system is assigned a unique receiving sensor for identifying the car. The transaction manager 88 contains logic programming for determining whether a particular car 81–83 has been scanned already or if it is unique from prior scanned cars. The toll gate 86 may contain anti-fraud devices as well, such as weight-triggered checks against whether a receiving passive loop was detected or human toll collectors who can monitor the system.

As will be appreciated, the horizontally and vertically oriented scanners described above can be used in wide range of applications where an object coded with a unique receiving passive loop passes below or adjacent a scanning array of plasma loop sensors. Further, the particular vertical or horizontal orientation shown in the examples is not intended to be limiting, as the scanners could be oriented to any fixed position which is more practical, subject to ensuring the plasma loop readers in the scanner are oriented to scan the appropriate area.

And, when a unique identification is not required, but merely detection, the receiving passive loop in the object to be detected does not need to include a unique code. The scanning array is used to simply detect the presence of the receiving passive loop and generate an alert, such as in a store security system or another gated area for holding animals or objects carrying receiving passive loops having a scanner at the gate.

As an example, in another embodiment of a scanning system, FIG. 11 shows a gate 91 having two walls containing scanners 92, 92a connected to an alarm system 93. A person 95 has a card 97 or other substrate carrying a receiving passive loop. If the person 95 passes through the gate 91 with the card 97, the plasma loop sensors in the scanners 92, 92a will detect the presence of the card 97 by interaction with the passive loop and the alarm system 93 will generate a response, such as shutting the gate 91, sounding a siren or making a light flash. Such a scanning system can be used for ensuring certain persons do not exit a gated area, provided compliance with carrying the card 510 can be guaranteed.

Alternatively, the card 97 may contain a coded identifier for the person 95. The card 97 may have a unique identifier, or simply coded to indicate membership in a group or class. The card 97 can be coded to permit access through some gates 91 without sounding an alarm, while passing others will activate the alarm. In such cases the scanners 92, 92a and alarm system 93 include a code table for interpreting which card 97 is passing the gate 91 and determining the permissions associated with the encoding on the card 97 before sounding an alarm or preventing passage.

Figure 12:
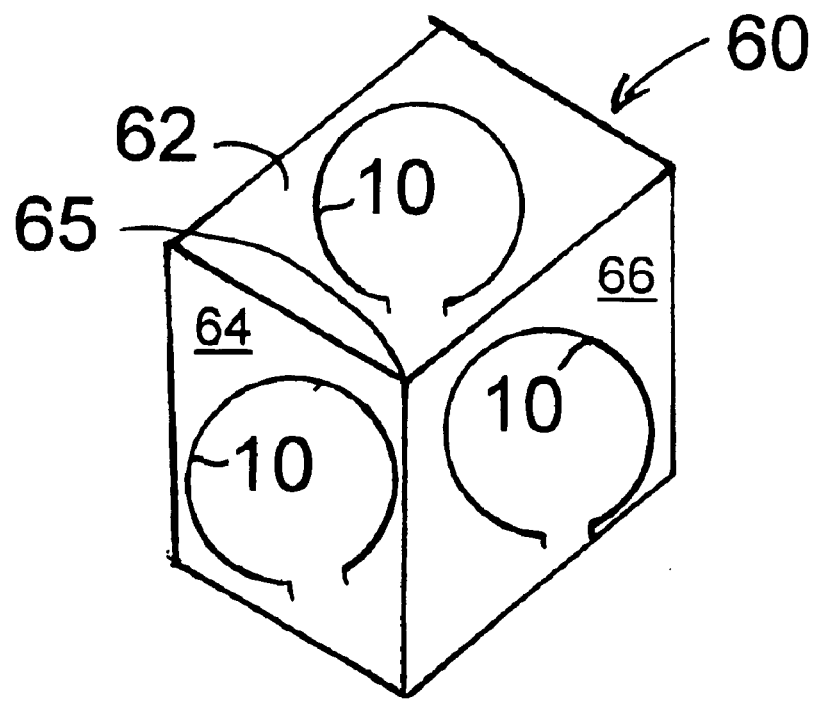
FIG. 12 is a top, left, front perspective view of a cube having a sensor loop on each of the three faces adjacent a vertex.

In FIG. 12, a further alternative sensor 60 configuration is displayed. The sensor 60 is formed as a cube with sensor loops 10 provided on at least three panels 62, 64, 66 adjacent one vertex 65 of the cube. The sensor loops 10 are connected to a switch, such as in the circuit of FIG. 4, for activating the sensor loops 10 in cyclical succession. The sensor loops 10 may be controlled by mechanical switches, plasma switches or solid state switches. Preferably, the switch is a low resistance switch. The resistance when the loop 10 is conducting, or closed, is preferably less than 1 Ohm, while in the open state, the resistance should be high. The open state capacitance can be low.

It should be understood that any one or a combination of the plasma loop sensor 10, metal loop sensor 30 with plasma section 31 or multiple loop plasma sensor 71 can be used in the arrays and scanning systems described herein.

The loop antennas described herein can be used effectively in both near-field and far-field applications, as defined previously, using magnetic induction or electromagnetic wave interaction between sensor loops 10 and passive or active sensed loops. And, the loop antennas are useful as RFID sensors, able to send and receive electromagnetic wave signals at frequencies including radio frequency up to Terahertz range frequencies. That is, each of the sensors described herein as using only magnetic induction can also rely instead upon electromagnetic wave interaction when the sensing unit or other signal generator is properly driven, so that the sensor system is expanded for use in far-field applications.

For example, in the toll collection system of FIG. 11, RF frequency electromagnetic waves may be generated and interact with a unique receiving sensor in each car to generate an RF return signal which is interpreted in the same manner as the signal generated solely by magnetic induction. A far-field sensor may be preferable in this application in particular to permit higher vehicle speeds and to provide more distance between a vehicle and toll barriers, since a far-field sensor will be effective at a greater range.

Further, although the sensed loops 35 are referred to herein as passive loops, it is envisioned that the sensed loops can be active also, so as to produce their own electromagnetic field. For example, a lithium battery source could be connected with the sensed loop and frequency changing circuit like that shown in FIG. 2 to power the sensed loop and circuit. The principles of near-field induction and far-field electromagnetic wave interaction are not changed and the plasma loop sensors 10, 30, 71 can still detect the presence or absence of such active sensed loops, as well as receive information from the sensed loops.

An alternate reconfigurable antenna, which can be used as the scanning element of any of the examples of FIGS. 9–11, among other things, will now be described with reference to FIGS. 13A–17.

Figure 13A:
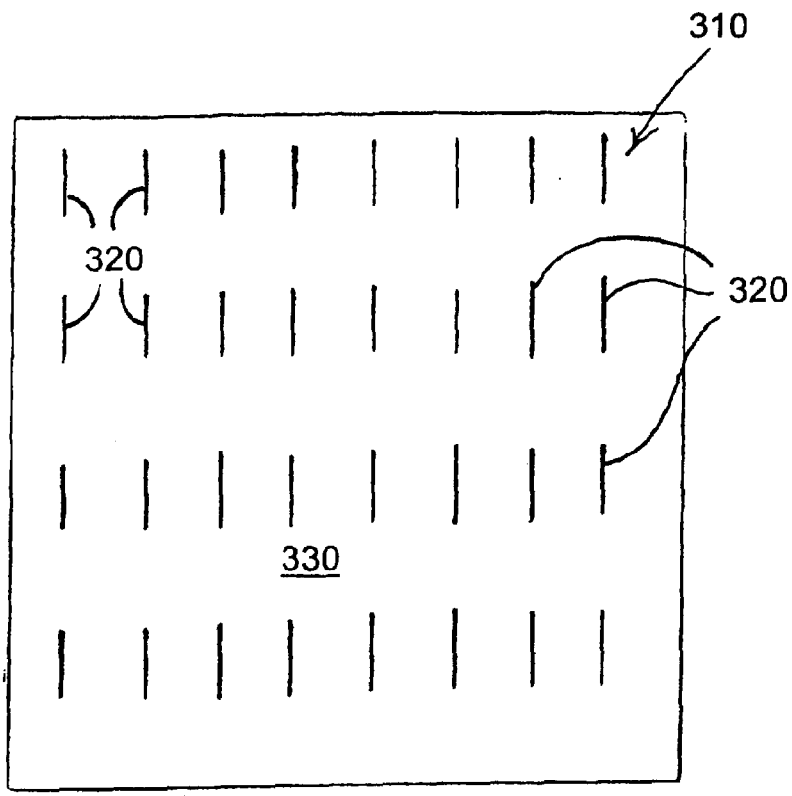
FIG. 13A is a schematic representation of a planar array of variable conductive elements on a dielectric surface in a non-conducting state.

FIG. 13A shows an array 310 of linear variable conductive elements 320 on a dielectric surface 330. The array 310 of FIG. 13A represents the foundation of the steerable antennas described herein. The array is configurable, by energizing all, none or specific ones of the elements 320, to filter selected frequencies of electromagnetic radiation, including in the optical range. It should be noted that elements 320 are dipoles. Feeds (not shown) are provided to each element 320 in the array 310 using connectors which are electrically small with respect to the dipole and relevant frequencies.

Depending on the frequency range desired to be affected by the array 310, the variable conductive elements 320 are formed by different structures. In the RF frequency range, the variable conductive elements 320 are a gaseous plasma-containing element, such as a plasma tube. In the millimeter infrared or optical region, the variable conductive elements 320 can be dense gaseous plasma-containing elements or semiconductor elements. And, in the optical region, the elements are photonic bandgap crystals. The variable conductive elements 320 are referred to herein primarily as gaseous plasma-containing elements or plasma tubes, but, unless specifically stated otherwise, are intended to alternately include semiconductor elements or photonic bandgap crystals, depending on the desired affected frequency of the incident electromagnetic waves. And, as used herein, plasma tube or plasma element is intended to mean an enclosed chamber of any shape containing an ionizable gas for forming a plasma having electrodes for applying an ionizing voltage and current.

Figure 13B:
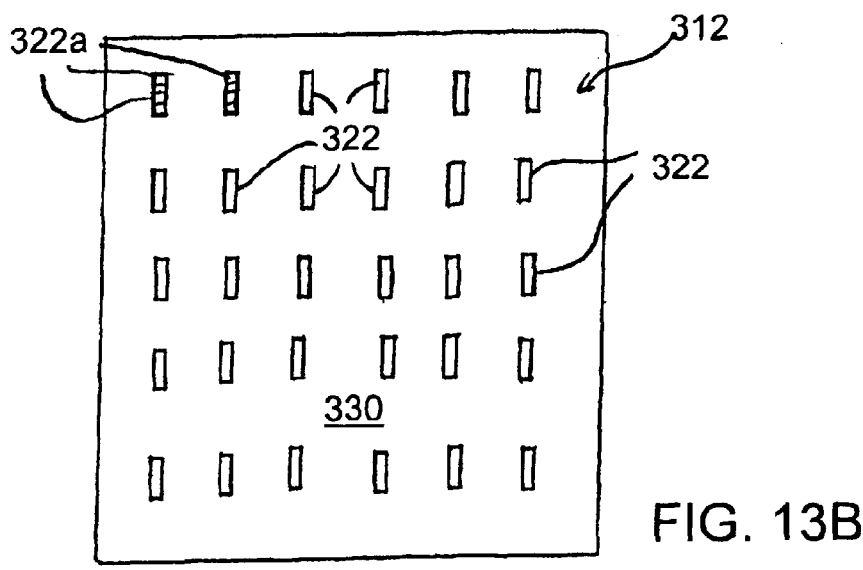
FIG. 13B is a schematic representation of a planar array of slot elements on a dielectric surface in a non-conducting state.

FIG. 13B illustrates an alternate embodiment of the array 310 of FIG. 13A. In FIG. 13B, a second array 312 has slot elements 322 on a dielectric substrate 330. Slot elements 322 may also be plasma elements, photonic bandgap crystals or semiconductor elements, depending on the filtered frequencies.

The arrays 310, 312 of the invention use plasma elements 320, 322 as a substitute for metal, as depicted in FIGS. 13A–B. When metal is used instead for the elements 320, 322 each layer has to be modeled using numerical methods and the layers are stacked in such a way to create the desired filtering. Genetic algorithms are used to determine the stacking needed for the desired filtering. This is a complicated and numerically expensive process.

In contrast, arrays 310, 312 can be tuned to a desired filtering frequency by varying the density in the plasma elements. This eliminates much of the routine analysis involved in the standard analysis of conventional structures. The user simply tunes the plasma to get the filtering desired. Plasma elements 320, 322 offer the possibility of improved shielding along with reconfigurability and stealth. The array 310 of FIG. 13A, for example, can be made transparent by simply turning the plasma off.

As the density of the plasma in a plasma element 320 is increased, the plasma skin depth becomes smaller and smaller until the elements 320, 322 behave as metallic elements and the elements 320, 322 create filtering similar to a layer with metallic elements. The spacing between adjacent elements 320, 322 should be within one wavelength of the frequency desired to be affected to ensure the elements 320, 322 will function as an array.

The basic mathematical model for these arrays 310, 312 models the plasma elements 320, 322 as half wavelength and full wavelength dipole elements in a periodic array 310, 312 on a dielectric substrate 330. Theoretically, Flouquet's Theorem is used to connect the elements. Transmission and reflection characteristics of the arrays 310, 312 of FIGS. 13A–B are a function of plasma density. Generally, as plasma density increases in the elements 320, 322, the arrays 310, 312 will block transmission and reflect incident electromagnetic waves of increasing frequency.

In the array 310, 312 of FIGS. 13A–B, a scattering element 320, 322 is assumed to consist of gaseous plasma contained in a tube. It should be noted that the plasma elements 320, 322 may be divided along their lengths into segments 322a for the purpose of defining current modes.

The arrays 310, 312 can be designed to be a switchable reflector. By placing the elements 320, 322 closer together, a structure is produced which acts as a good reflector for sufficiently high frequencies. A reflective array 12, has the same general structure as in FIG. 13B, but with the elements 322 more densely packed. For this example, the length, diameter, vertical and lateral spacing are 10 cm, 1 cm, 11 cm, and 2 cm, respectively.

The calculated reflectivity for the perfectly conducting case as well as for several values of the plasma frequency using the values above was determined. For frequencies between 1.8 GHz and 2.2 GHz the array 12 operates as a switchable reflector, dependent upon the plasma frequency in the scattering elements 322. By changing the plasma frequency of the elements 322 from low (about 1.0 GHz) to high (10.0 GHz or more) values, the reflector goes from perfectly transmitting to highly reflecting.

The arrays 310, 312 can function in this manner based on the understanding that the current modes induced in the plasma elements 320, 322 have the same form but different amplitude from those for a perfect conductor. The reflectivity of the array 310, 312 is directly proportional to the squared amplitude of the current distribution induced in the elements 320, 322 by the incident radiation. Based on this observation, it is clear the reflectivity of a plasma array structure can be obtained from that for a perfectly conducting structure by scaling the reflectivity with an appropriately chosen scaling function.

The scaling function is defined based on the results of the exactly solvable model of scattering from an infinitely long partially conducting cylinder. The scaling of the current amplitude vs. plasma frequency in the plasma FSS array is approximated as an isolated infinitely long partially conducting cylinder.

The reflectivity for a perfectly conducting array, obtained by the Periodic Moment Method, is then scaled to obtain the reflectivity of the plasma array vs. plasma frequency. The results of these calculations support the concept that switchable filtering behavior can be obtained with the use of the plasma array 310, 312 of FIGS. 13A–B.

With respect to FIGS. 13A–B, it should be observed that while the arrays 310, 312 have been described as elements 320, 322 supported on dielectric 330, the arrays 310, 312 may be formed in reverse as well. That is, permanent slots may be formed through a variable conductive area, such as a plasma body, surrounding the slot. The effective size of the slot can be changed with respect to electromagnetic waves by modifying the properties of the variable conductive area surrounding the slot. For example, by switching a plasma body between conducting and non-conducting states, and/or changing the frequency and plasma density in the plasma body, the effective size of the slots can be changed. Changing the effective size of the slots permits the array to filter different frequencies.

An example of the utility of this feature is found in connection with radomes, which are conventionally formed as metal shells with bandpass slots tuned for the enclosed radar antenna operating frequency. A radome is improved by forming the radome structure from the substrate 330 and providing an array 310, 312 with slots surrounded by variable conductive regions on the substrate 330. Unlike a conventional radome, the array 310, 312 of the invention can include fixed slots in this embodiment, but is also reconfigurable to pass different frequencies electronically rather than mechanically. By changing the conductivity of the variable conductive regions surrounding the slots, the effective slot size is changed, and the radome is "retuned" to a different frequency. Thus, a multiple frequency radar antenna could be housed in a radome formed by an array 310, 312 of the invention.

In a further variation of this embodiment, the dielectric substrate 330 could be replaced by a conductive metal substrate. Depending whether the array 310, 312 is formed by plasma elements or slots surrounded by variable conductive regions, the result is either a single frequency or tunable frequency bandpass filter. But, in such case, it should be understood that the limitations of using conductive metal as the substrate will apply to the function of the arrays 310, 312 used alone or together.

Figure 13C:
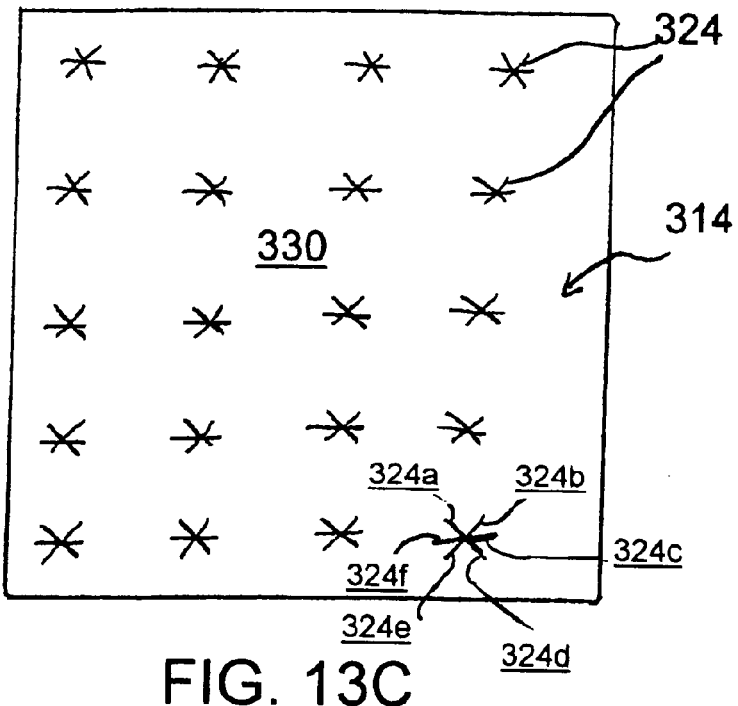
FIG. 13C is a schematic representation of a polarizer in the form of a planar array of spoked variable conductive elements on a dielectric surface in a non-conducting state.
Figure 13D:
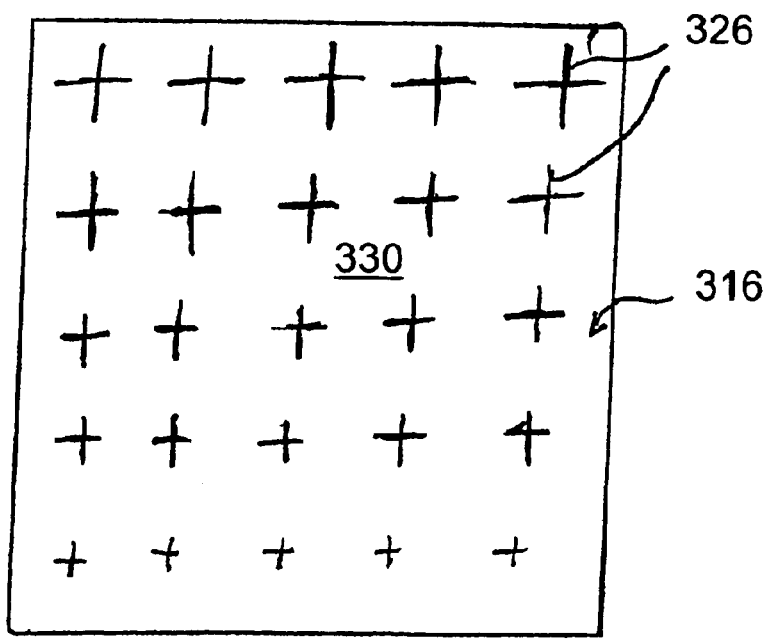
FIG. 13D is a schematic representation of a planar array of progressively sized, variable conductive elements on a dielectric surface in a non-conducting state.

FIGS. 13C and 13D illustrate further embodiments of the arrays 310 in which the plasma-containing elements 320 have different configurations to produce different effects.

FIG. 13C shows an array 314 which can function as a polarizer. Variable conductive scattering elements 324 in the polarizing array 314 are star-shaped. Polarization on different axes is effected by changing the conductivity of the several spokes 324a–f of each element 324 in the array 314. By coordinating the conductivities of each spoke 324a–f of the several elements 324 in the array 314, a wave passing through the array can be polarized. More importantly, the polarization of an incident signal can be controllably changed simply by changing the conductivities of the spokes 324a–f.

In FIG. 13D, the array 316 on substrate 330 is composed of variable conductive elements 326 which are sized progressively smaller in each row of the array 316. That is, the top row of elements 326 are largest, while the bottom row of elements 326 are the smallest.

An array 316 as shown in FIG. 13D will produce progressive phase shifting, for example, when the array 316 is positioned ⅛ wavelength above a ground plane (not shown). A standing wave is developed between the dielectric substrate 330 and array 316 and the ground plane. Depending on the effective length of the elements forming the array 316, a phase shift is produced which causes the reflection angle to change. By electrically reconfiguring the length of the variable conductive elements 326 in the array 316, a flat, variable phase shift, steerable antenna is produced having characteristics otherwise similar to a parabolic steerable antenna with fixed phase shifts.

When multiple arrays as shown in FIGS. 13A–D are used in combination, selective filtering and other effects can be produced. Any of the arrays 310–316 can be driven by feeds as well to act as a transceiving antenna, rather than simply powered for producing particular effects. For example, a driven array 310 of dipoles as in FIG. 13A, can be combined with a polarizing array 314 as in FIG. 13C, a bandpass array 310, 312 of FIG. 13A or 13B and a phase shifting array 316 of FIG. 13D to transmit polarized electromagnetic waves at selected frequencies in specific, changeable, radial directions. The arrays 310–316 used should all be spaced within one wavelength of the transmitted frequency of each other. Alternatively, as discussed herein, the arrays 310–316 can be combined for use with other driven antennas to control their radiation patterns.

While the variable conductive elements 320, 322, 324, 326 illustrated in FIGS. 13A–D are preferably dipoles or the shapes indicated, the arrays 310–316 may be formed by elements 320–326 of different geometric shape. Alternate elements may have any antenna or frequency selective surface shape, including dipoles, circular dipoles, helicals, circular or square or other spirals, biconicals, apertures, hexagons, tripods, Jerusalem crosses, plus-sign crosses, annular rings, gang buster type antennas, tripole elements, anchor elements, star or spoked elements, alpha elements, and gamma elements. The elements may be represented as slots through a substrate surrounded by variable conductive surfaces, or solely by variable conductive elements supported on a substrate. The slots may be filled by a dielectric, or simply be open and filled by air.

Figure 14A:
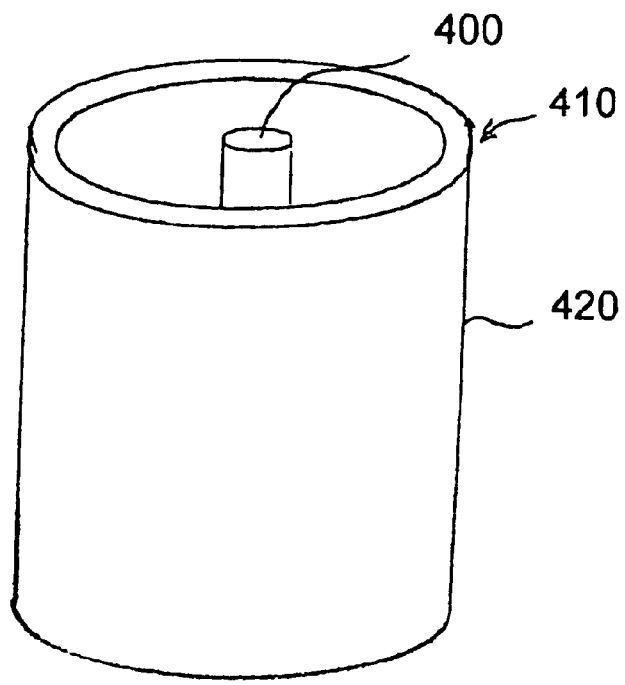
FIG. 14A is a schematic representation of an omnidirectional antenna surrounded by an annular plasma ring.

FIG. 14A shows a steerable antenna 410 of the invention composed of an omnidirectional antenna 400 surrounded by an annular shield 420. Antenna 400 is a dipole, and can be a radiating plasma tube, a conventional metal dipole antenna, or a biconical plasma antenna for broadband radiation. Shield 420 is composed of variably conductive elements which can be switched between conducting and non-conducting states, and made to conduct at different frequencies. In one embodiment, the shield 420 may be formed by a cylindrical array formed by curling one or more of any of arrays 310–316 illustrated in FIGS. 13A–D. In a preferred embodiment, illustrated in FIGS. 14B and 14C and discussed in greater detail below, the shield 420 is composed of vertically oriented plasma-containing elements 422, such as plasma tube elements. The plasma tubes 422 form a simple array of one row and multiple columns surrounding the antenna 400. The plasma tubes 422 may be mounted in a substrate or other electromagnetically transparent material to assist maintaining their placement.

The configuration of antenna 410 becomes a smart antenna when digital signal processing controls the transmission, reflection, and steering of the internal omnidirectional antenna 400 radiation using the shield 420 to create an antenna lobe in the direction of the signal. Multilobes may be produced in the case of the transmission and reception of direct and multipath signals. The shield 420 is opened or made electrically transparent to the radiation emitted by the omnidirectional antenna 400 using controls to switch sections or portions of the shield 420 between conducting and non-conducting states, or by electrically reducing the density or lowering the frequency of the shield elements 422.

The distance between omnidirectional antenna 400 and plasma shield 420 is important, since for given frequencies, the antenna 410 will be more or less efficient at passing the transmitted frequencies through apertures in the shield 420. Specifically, the release of electromagnetic antenna signals from antenna 400 depends upon the annular plasma shield 420 being positioned at either one wavelength or greater from the antenna 400, or at distances equal to the wavenumber times the radial distance, or kd, to interact with the transmitted signals effectively. Thus, an electromagnetically effective distance between the shield 420 and antenna 400 is one wavelength or greater of the transmitted frequencies the shield is intended to act upon, or at distances corresponding to kd are satisfied, as discussed further herein.

It is envisioned that multiple annular plasma shields 420 can be positioned around the antenna 400 to provide control over transmission of multiple frequencies. For example, only the shield 420 corresponding to a desired transmission frequency could be opened along a particular radial, while all other frequencies are blocked through that aperture by other shields 420.

Figure 14B:
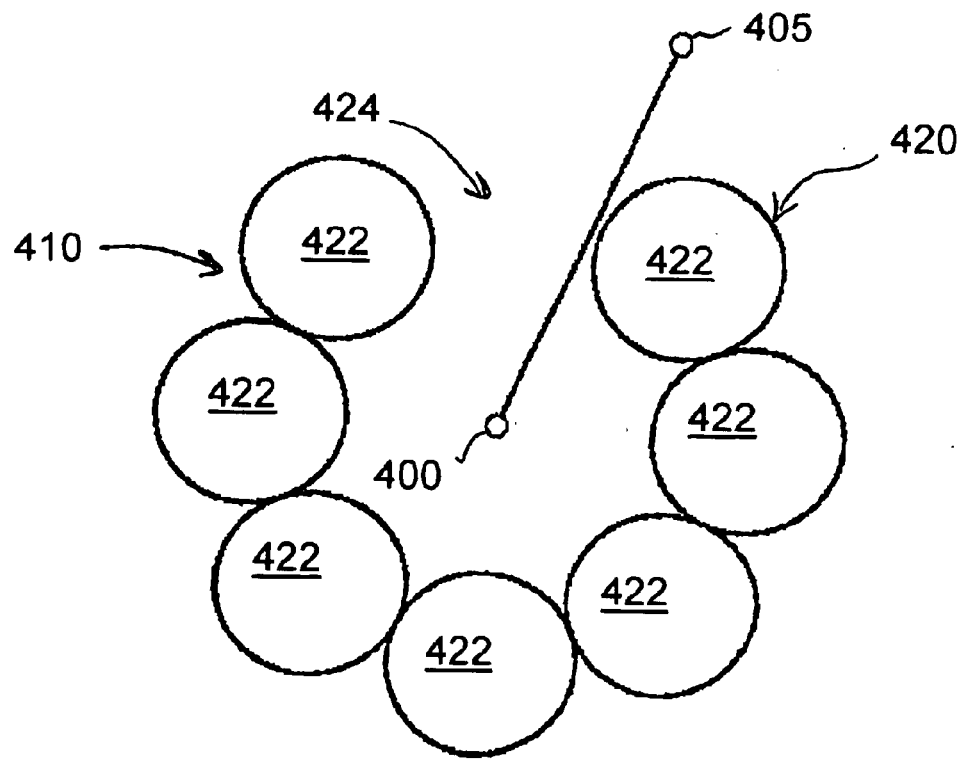
FIG. 14B is a diagram of an omnidirectional antenna surrounded by eight plasma tubes with seven energized.

FIGS. 14B and 14C illustrate two embodiments of the antenna 410 of FIG. 14A. The antenna 410 in each case is comprised of a linear omni-directional antenna 400 surrounded by a cylindrical shell of conducting plasma elements 422 forming plasma shield 420. Preferably, the plasma shield 420 consists of a series of tubes 422 containing a gas, which upon electrification, forms a plasma. Fluorescent light bulbs, for example, can be used for tubes 422. The plasma is highly conducting and acts as a reflector for radiation for frequencies below the plasma frequency. Thus when all of the tubes 422 surrounding the antenna are electrified and the plasma frequency is sufficiently high, all of the radiation from omnidirectional antenna 400 is trapped inside the shield 420.

By leaving one or more of the tubes 422 in a non-electrified state or lowering the frequency below the transmission frequency of antenna 400, apertures 424 are formed in the plasma shield 420 which allow transmission radiation to escape. This is the essence of the plasma window-based reconfigurable antenna, or plasma window antenna (PWA). The apertures 424 can be closed or opened rapidly, on micro-second time scales in the case of plasma, simply by applying and removing voltages.

FIG. 14B shows the configuration when the PWA 410 has seven active conductors 422 in the shield 420. The following simple geometric construction for creating the plasma shield 420 is used. For forming a complete shield 420, N cylinders 422 are placed with their centers lying along a common circle chosen to have the source antenna 400 as its center. Some distance from the origin d is selected as the radius. The distance can be calculated to produce optimal results for a given PWA 410 frequency, but should be within one wavelength to be effective. Then, the circle of radius d is divided into equal segments subtending the angles:

$$\Psi_1 = 2\pi d N$$

where the integer 1 takes on the values $-1, 0, 1, \ldots N-1$. The apertures 424 are modeled by simply excluding the corresponding cylinders (plasma tube 422) from consideration. Thus, for example, the mathematical model of FIG. 14B was generated by first constructing the complete shield 420 corresponding to N=8. Then, the illustrated structure having one aperture 424 was obtained excluding the cylinder corresponding to 1–2 where we have numbered the cylinders assuming the angle to be measured from the positive x-axis (i.e, extending 90° to the right).

In the following analysis, it is convenient to specify the cylinder radius through the use of a dimensionless parameter $\tau$ which takes on values between zero and unity. More explicitly, the radius of a given cylinder (all cylinder radii assumed to be equal) is given in terms of the parameter $\tau$, the distance d of the cylinder to the origin, and the number of cylinders needed for the complete shield N by the expression:

$$a = d\tau \sin(\pi N)$$

It should be noted that there is no need to restrict the steerable antenna 410 to configurations of touching conductor cylinders. When the plasma tubes 422 are powered to sufficiently high plasma density that the frequency exceeds the transmission frequencies, the size of any gaps between the tubes 422 and distance from the omnidirectional antenna 400 determine the extent of signal reflection caused by the plasma tubes 422. When spaced properly and powered sufficiently, plasma tubes 422 produce a perfectly reflective shield 420 that prevents electromagnetic signals from omnidirectional antenna 400 from escaping and transmitting, even when gaps between tubes 422 are present.

As the plasma density, and therefore, the frequency, are decreased, in a particular plasma tube 422, that tube becomes transparent for electromagnetic signals generated by the omnidirectional antenna 400. Thus, if a single plasma tube is powered down so as to be transparent to a particular frequency or all frequencies, an electromagnetic signal transmitting from omnidirectional antenna 400 will be permitted to escape or broadcast along the radials passing through the aperture formed by the transparent plasma tube 422 and any adjacent gaps. The antenna signal can be steered by simply opening and closing apertures by powering and unpowering the plasma tubes 422. The amount of radiation released will depend in part upon the distance of the plasma tube ring from the antenna 400 times the wavenumber of the antenna radiation.

A multi-frequency steerable antenna can be created by adding further rings of plasma tubes 422 spaced apart and at radial distances from antenna 400 to optimally affect particular frequencies. An antenna of this configuration permits selectively transmitting specific frequencies along specific radials.

As a further expansion of the frequency bandwidth of the antenna, the transceiving antenna 400 can be a nested antenna. That is, a smaller, higher frequency antenna can be nested inside a larger, lower frequency antenna. The nested construction is possible especially when using plasma antennas, as the plasma chambers forming each antenna are separated from each other and can be individually made active to transmit or receive. Higher frequency signals from the encased antenna will pass through the plasma of the lower frequency antenna. The individual antennas making up the nested antenna can be turned on and off, providing additional control over the transceived frequencies of the reconfigurable antenna 410.

And, the nested antenna configuration can also be used to permit simultaneous transmission and reception by the reconfigurable antenna 410. For example, one frequency can be transmitted by one nested antenna, while a second frequency band is monitored for reception by a second one of the nested antennas. Multiple antennas beyond two can be nested together to transmit and/or receive on other frequencies.

A more complex application of the arrays of FIGS. 13A–D is shown by FIGS. 15A and 15B, in which several of the arrays are arranged in stacked layers 810–818. In each case, the layers 810–818 are selected to produce a particular effect in conjunction with each other on the signal broadcast through the surrounded antenna 402. The antenna 402 shown is a biconical, center-fed antenna, which type of antenna is particularly useful for broadband applications. The biconical antenna 402 is preferably a plasma-filled cone antenna, so that the advantages gained thereby are obtained, including the broad frequency range resulting from different plasma densities along the length of each end of the antenna 402. A transceiver 800 is attached to the antenna 402 through a feed for generating and interpreting signals transmitted through and received from antenna 402.

The array layers 810–818 are arranged concentrically around the antenna 402, and are spaced within one wavelength of the transmitted signals of each other. The optimal spacing between layers, and elements in each layer, can be calculated, as with the shield 120 of FIG. 14A, above. The spacing between antenna 402 and the layers 810–818 is the same as with the shields 420 of FIGS. 14A–C, above. The layers 810–818 are selected to produce a particular effect, such as a selective bandpass filter, polarized transmission, phase shifting, and steering the transmitted signals by using one of the array types of FIGS. 13A–D for each layer 810–818. The substrate 330 of each array type used is preferably formed into a cylinder, so that the array is equidistant from the antenna 402 at each radial.

For example, each layer 810–818 may be a frequency filter, such as the array of FIG. 13A or 13B. Different frequencies can be selectively filtered by choosing different element 320, 322 configurations in the arrays 310, 312 forming the layers 810–818. That is, for higher frequency filters, more rows and columns of elements 320, 322 should be used in array like that of FIG. 13A or 13B, while lower frequencies require fewer elements 320, 322 to block. Biconical antenna 402 can generate several different frequencies due to the changing cross-section of the antenna shape.

The frequency filter formed by layers 810-818 can be used to pass or block particular frequencies within the range affected by the filter on selected radials, while others are permitted to pass. In a preferred arrangement, layer 810 is an array for reflecting, or blocking, the highest frequencies transmitted or received, while layer 818 is an array for reflecting the lowest frequencies. Layers 812–816 are selected to reflect progressively lower frequencies between those affected by layers 810 and 818. It should be appreciated that higher frequencies will continue to pass through lower frequency tuned arrays, even when those arrays are active. But, to pass the lowest frequency signals, all of the shield layers 810–818 must be effectively opened along the desired radial(s) by making the array elements non-conducting in the window where the low frequency signal is transmitted. When the arrays are sufficiently large, it is possible to control transmission and reception in both the radial and azimuth axes by creating a window in the shield layers 810–818 and sequentially opening and closing the window.

Alternatively, one of the layers 810–818 may be a polarizer or phase shifter array, such as illustrated by FIGS. 13C and 13D. The shield layers 810–818 work in the same manner as above with respect to received signals. Thus, inclusion of a phase shifter array permits reflection and scattering of certain received signals, such as to avoid active detection of the antenna 402. For example, the layers 810–818 may be designed to deflect incident electromagnetic signals at non-backscattering angles, so as to produce no, or only a very small, radar cross-section. A phase shifter array provides one arrangement for steering incident signals. A further use of the layers 810–818 and antenna 402 is to act as a repeater station, for propagating a received signal along all or selected radials.

It should be understood as within the scope of this invention that the antenna 400 of FIGS. 14B and 14C or antenna 402 of FIGS. 15A–B can be substituted for each other, or other antennas may be used. One alternative antenna configuration which is contemplated combines two or more antennas in the same manner as the arrays 310–316 which are stacked in layers 810–818. That is, a conventional omnidirectional dipole may be surrounded by a co-axially oriented helical antenna, or a plasma biconical antenna may consist of two plasma biconical antennas formed to have one antenna inside the other, in a nested configuration. A greater range of different frequencies may be transceived using the nested antennas or dual biconical antenna by producing a higher plasma density in the inner antenna and a lower density in the outer antenna. The higher frequencies produced in the inner plasma biconical antenna will pass easily through the lower plasma density of the outer biconical antenna.

In the case of combining a helical antenna co-axial with another antenna, such as a dipole, a multi-axis antenna is formed when the frequencies are properly selected. The helical antenna will transceive primarily along radiation lobes oriented extending on the longitudinal axis of the helix, while an omnidirectional dipole located along that axis will transceive mainly in a donut shaped region radially surrounding the dipole antenna. The frequencies must be selected similarly to the arrays to ensure proper transmission of higher frequencies through lower ones.

In a further embodiment, the layers 810–818 may consist of transmitting arrays arranged to produce an arbitrary bandwidth antenna. In such case, the layers 810–818 can be used in conjunction with a shield 420 or other filtering array 310–316. The transmitted frequency of layer 810 should be the highest and that of layer 818 the lowest. The layers 810–818 may be turned on and off to produce single and multi-band effects. When used as transmitters, the layers 810–818 need not be within one wavelength of the adjacent layers 810–818, and can be more effective when spaced greater than one wavelength apart from the adjacent layers 810–818. Such spacing does not significantly increase the footprint size of the transmitting antenna in most cases, for example, when used in the millimeter or microwave bands and higher frequencies, such as used by personal or portable electronics.

Further, any of the arrays 310, 312, 314, 316 on substrate 330 may be arranged co-planar or bent to have a particular curvature, such as for parabolic reflectors, or into cylinders, as described above. The arrays 310–316 may alternatively be arranged on the surfaces of one or more planar substrates 330 to form volumetric shapes surrounding an antenna 400 other than cylinders, including closed or open end triangles, cubes, pentagons, etc. While it is preferred that the substrates and arrays form the walls of geometric shapes, the arrays may be conformed to any surface for use, provided the appropriate calculations are done to ensure proper location of the elements for the desired purpose.

Resonant waves set up between layers of elements 320–326 as shown in FIGS. 13A–D will cause the reconfiguration in progressive phase shifting to provide reconfigurable beam steering from an antenna, such as a horn antenna or similar feed.

In a further modification, the reflective shield can include annular tubes stacked perpendicular around the plasma tubes 422, to provide additional control over the size of aperture created. When specific annular tubes are unpowered in combination with certain plasma tubes 422, a transmission window through the reflective shield is formed along a particular radial and at a particular elevation. Thus, steering in the vertical direction can be combined with radial steering.

Further, the powered plasma tubes in any cylinder may act as a parabolic reflector for the affected frequencies, thereby strengthening the transmitted signal through an aperture. Similarly, the plasma densities can be adjusted to produce plasma lenses for focusing the transmitted antenna signal beam.

Preferably, the apertures will be at least one wavelength in arc length to permit effective transmission. It should be noted that Fabry-Perot Etalon effects may occur for the release of electromagnetic radiation through the antenna while powering the plasma tubes 422, but at lower plasma densities than for signal reflection.

Figure 16:
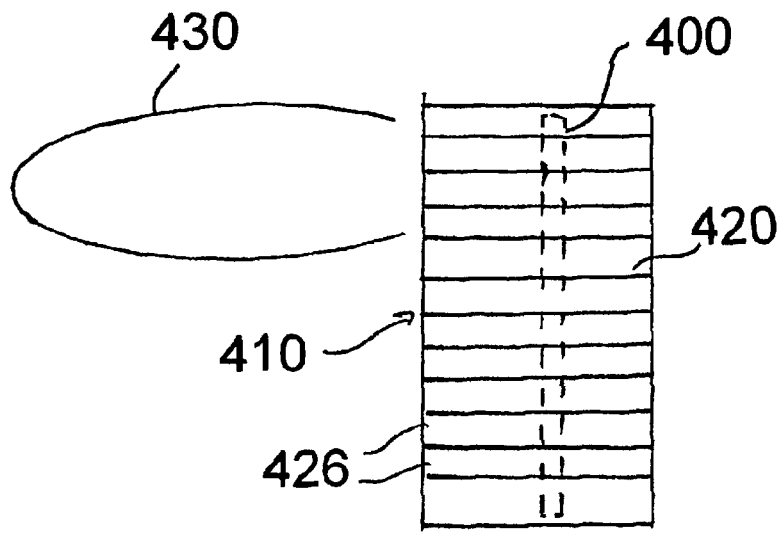
FIG. 16 is a diagram illustrating the radiation pattern of a steerable antenna of the invention.
Figure 17:
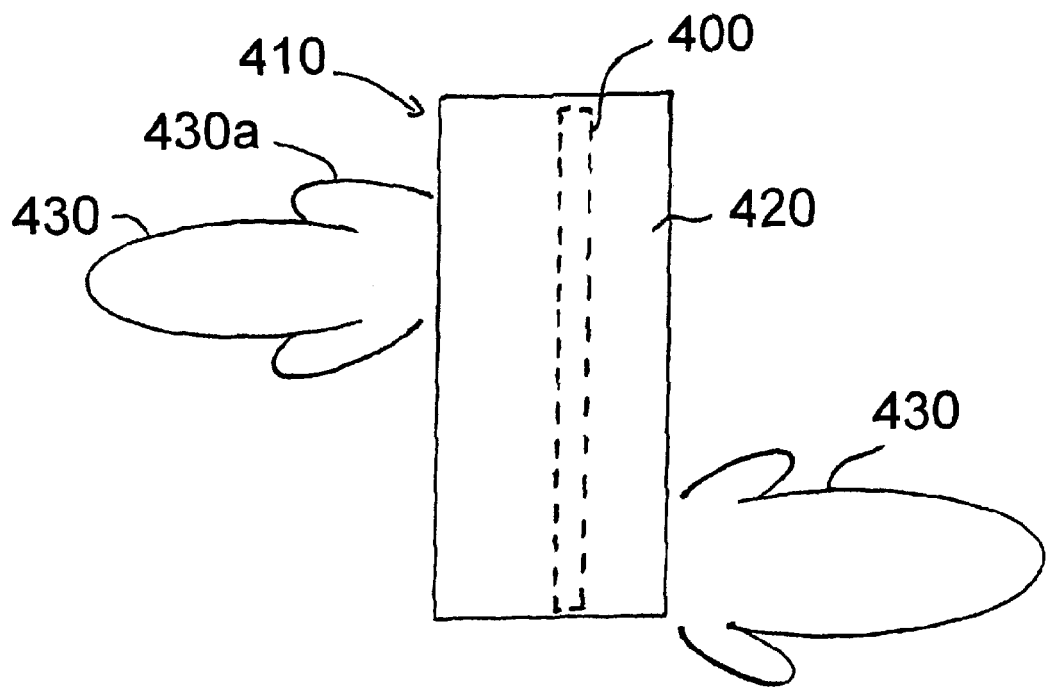
FIG. 17 is a diagram illustrating the radiation pattern for a differently configured steerable antenna of the invention.

FIGS. 16 and 17 illustrate transmission radiation lobes which can be produced using the antenna 410 of the invention. FIG. 16 shows how the reflective shield 420 can include a layer of annular plasma tubes 426 oriented perpendicular to vertical shield elements. Thus, in FIG. 16, a transmission radiation lobe 430 is produced along a particular radial and at an elevation selected by unpowering the upper ones of the annular plasma tubes 426.

Similarly, in FIG. 17, two different transmission radiation lobes 430 are produced by creating apertures on each side of antenna 410 and at different elevations. The transmission radiation lobes 430 illustrated have side lobes 430a.

The steerable antennas illustrated in each of FIGS. 14A–17 can be substituted for the loop sensors 10, 30, 71 in each of the examples above. The antennas described in FIGS. 14A–17 are particularly useful in far field applications, where the tags which are being sensed are likely located outside of an effective near field range. While the loop sensors 10, 30, 71 can be used in far field applications as electromagnetic wave transceivers, they are preferred for use in near-field applications, and the steerable antennas of FIGS. 14A–17 are preferably used in far field application.

Figure 18:
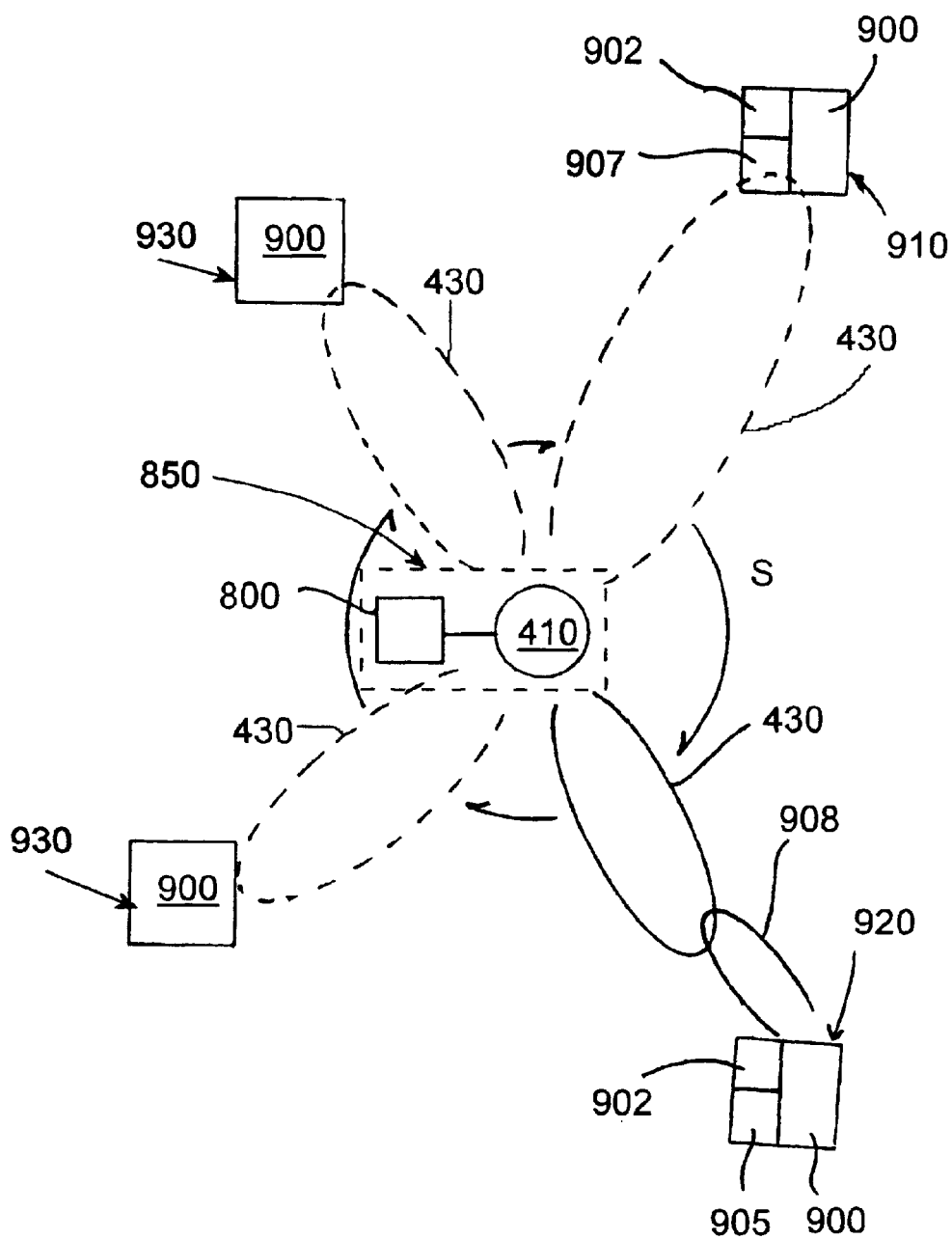
FIG. 18 is a diagram displaying electromagnetic wave interaction between a scanning antenna and passive and active ID tags.

FIG. 18 illustrates how the steerable antennas can be used in a scanner 850 to scan an area for ID tags 900. The ID tags 900 can be both passive and active, or activatable ID tags 900 as will be further described. The scanner 850 consists of reconfigurable antenna 410 and transceiver 800. The reconfigurable antenna 410 of scanner 850 emits a radiation lobe 430 through an opened section of the antenna shield 420 (not shown in FIG. 18). The radiation lobe 430 interacts with the ID tags 900 to sense their presence, or read data from the tags 900, and, in some cases, write date to the tags 900 as well. The radiation lobe 430 can be made to sweep a full circle around the antenna 410 by controlling which radials of the shield are opened and closed, so that scanning is intentionally limited to a single direction at a time, even though the actual transceiving antenna used in reconfigurable antenna 410 is an omnidirectional antenna. Transceiver 800 may contain switching and control programs for operating the shield and reconfigurable antenna 410 to this end.

Alternatively, the transceiver 800 may be two distinct units connected to different antennas within reconfigurable antenna 410. For example, the reconfigurable antenna 410 may use plasma nested antennas, stacked arrays, and plasma shields around an omnidirectional antenna as plasma filters or plasma frequency selective surfaces as individual layers or two or more layers to create large bandwidths or multi-bandwidth radiation patterns, so that one antenna transmits while the other receives, and no switching is necessary to control the transceiver 800. The arrangement permits simultaneous transmission and reception of signals, and the antenna 410 can operate continuously, if desired. The shield 420 still must be controlled to adjust the radial on which the antenna 410 transmits and receives simultaneously.

The ID tags 910, 920, 930 in FIG. 18 represent different versions of tags which can be sensed by the antenna 410. ID tags 930 are simply any type of antenna capable of interaction with the scanner 850 operating frequency. For example, ID tags 930 can be conductive metal loops, or other known RFID tags.

ID tags 910 and 920 are more complex versions which include an antenna 900, a code 902 and a power source 905, 907. The code 902 is connected with and transmitted by antenna 900 so that ID tag 910, 920 can provide more information to scanner 850 than simply indicating its presence, as with tags 930. The power sources 905, 907 operate differently, depending on the type of ID tag 910, 920.

ID tag 920 is shown in the active state, in which it transmits a tag radiation lobe 908 that interacts with the scanner radiation lobe 430. ID tag 920 is continuously powered by power source 905, so that it continuously generates radiation lobe 908. Power source 905 may be a battery sufficient to power antenna 900 or other power source with similar ability. Code 902 can include a controller for switching the power source 905 on and off, for example, when antenna 900 is a plasma loop 10, 30, 71, and a memory for storing an identifier and possibly for receiving and writing data transmitted by a scanning signal. ID tag 920 thus has two states—on and off. In the off state, it is electromagnetically invisible to the scanner 850 and cannot be activated without application of significant external power. In the on state, ID tag 920 actively provides information to scanner 850.

ID tag 910 represents yet another embodiment in which the antenna 900 is a plasma loop 10, 30, 71 that is weakly ionized or weakly powered by power source 907. The power source 907 may be a radioactive seed, a weak battery or other voltage source, or other known power sources. When scanner radiation lobe 430 impinges on antenna 900, the power transmitted by scanner 850 is sufficient to activate plasma loop 10, 30, 71 so that code 902 can be read by the scanner 850. One scanning antenna suitable for energizing the activatable ID tags uses pure neon gas plasma with a mercury additive. The antenna produces a plasma with high current at about 6 Torr pressure, without requiring a significant power increase to the scanning antenna.

Alternatively, the antenna 900 may be activated by an external power source other than the radiation lobe 430. In the weakly ionized state, ID tag 910 is electromagnetically invisible and does not interfere with other devices.

It should be noted that both ID tags 910 and 920 can be provided with or without code 902. Thus, the ID tags of the invention may be active or inactive transmitting tags (have a code 902), active or inactive passive tags (no code 902— sensed by interference only), and active or inactive activatable tags (have a weakly powered plasma antenna, with or without code 902).

Figure 19:
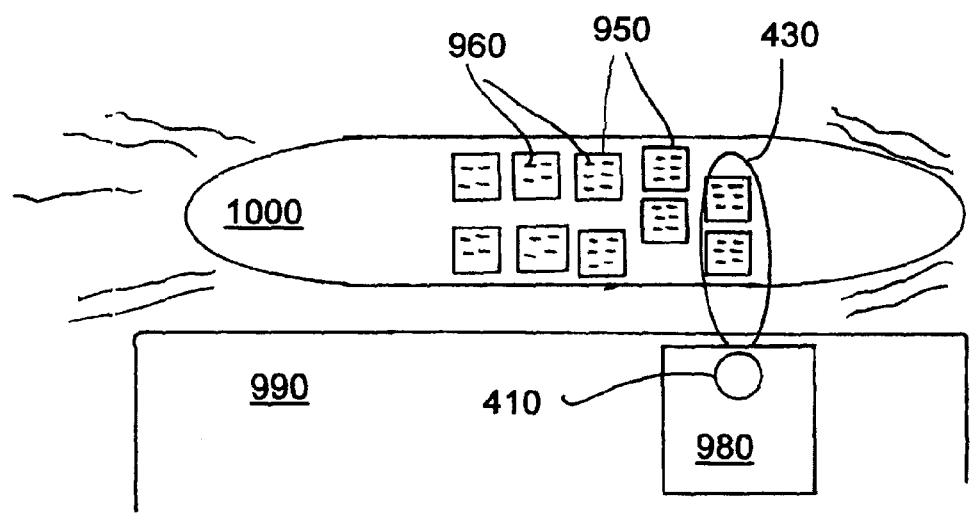
FIG. 19 is a diagram illustrating a scanner of the invention used to determine the contents of a ship containing goods marked with ID tags.

FIG. 19 demonstrates a further application of the antennas described herein used in a scanner for determining the contents of a ship 1000 entering a port or at dockside 990. The scanner again consists of an antenna 410 like that of FIGS. 14A–17 and a transceiver. The antenna 410 is mounted to a tower or building 980, which may include a control room for monitoring the scanning. The scanner transmits along a radiation lobe 430 in a direction selected by configuration of the antenna 410. In one embodiment, the radiation lobe 430 may be kept fixed, for example, as the ship sails past the antenna 410. Alternatively, the radiation lobe 430 can be swept through between angles parallel to the dock 990 and crossing all of the containers 950 on the ship 1000. In such case, the ship 1000 can remain stationary or move past the antenna 410.

In order for the scanner to be effective, a modification must be made to conventional shipping containers 950 to permit electromagnetic radiation to penetrate the container. The walls of the containers must have slots 960, similar to those used in arrays 310–316. The slots 960 are formed, for example, by dielectrics in the metal sides, which permits the scanning signals to interact with ID tags 900 on goods in the containers 950. The slot 960 configuration in the container 950 walls will determine what bandwidth of scanning frequencies can be used effectively to read and/or write to ID tags 900 on the container contents.

Further, it is envisioned that the interiors of the containers will be lined with electromagnetic absorptive material or absorbing dielectric cones. Such interior lining will prevent resonant signals from building within the container and causing unwanted interference with the scanning signal. As a further alternative, the ship hull, or when applied on land, a truck or airplane body, can be formed with dielectric slots for permitting specific frequencies to penetrate the hull and scan the contents for ID tags. The dielectric slots may be formed as described herein in connection with the arrays 310–316 as well. That is, the slots can be variable dielectric slots formed by variable conductive elements which either permit or block electromagnetic waves from passing, slots surrounded by variable conductive regions, or a constant dielectric material selected and arranged to permit a particular frequency band to pass.

While the example of FIG. 19 is described using the plasma window antenna 410, it should be understood that any of the reconfigurable antennas disclosed herein could be used. The same scanning can be done using the plasma loop sensors 10, 30, 71 in near or far field operation, as the distance between antennas and ID tags requires.

The scanners disclosed herein in each of the examples of FIGS. 9–11, 18 and 19 can use any of the antennas disclosed as the scanning element. That is any scanner disclosed can have plasma window antenna 410, stacked arrays 810–818, or arrays of plasma loop sensors 10, 30, 71 as the scanning element which broadcasts the scanning signal connected to a transceiver or similar component. Whichever antenna type is selected as the scanning element, a radiation lobe is generated based on information from the transceiver 800 for interaction with ID tags in the effective range of the scanner. Thus, while multiple plasma loops 10, 30, 71 are sequentially activated to scan multiple directions in one embodiment, the same scanning can be done using the plasma window antenna 410 by sequentially opening a transmission window to direct the transmission lobe along selected radials.

In all of the applications discussed above, plasma-containing elements used as plasma antennas or passive plasma elements can be operated in the continuous mode or pulsed mode. During the pulse mode, the plasma antenna or passive plasma elements can operate during the pulse, or after the pulse in the after-glow mode. To reduce plasma noise, the plasma can be pulsed in consecutive amplitudes of equal and opposite sign. Phase noise can be reduced by determining whether the phase variations are random or discrete and using digital signal processing. Phase noise, thermal noise, and shot noise in the plasma can also be reduced by digital signal processing.

It is recommended that AC bipolar pulses operated at a frequency above the ion acoustic wave frequency in the plasma be applied to the plasma for ionization and transmission purposes be used so as to reduce noise in any of these plasma antenna systems, including plasma antennas, plasma arrays including stacked plasma arrays both active and passive, plasma nested antennas, plasma shields, and any plasma readers or plasma antenna tags both active and passive. During the pulse cycle, the time between pulses called the afterglow state is the least noisy state.

All of the plasma elements described herein can be operated in the afterglow state using AC bipolar pulses with frequencies above the ion acoustic wave frequencies to minimize noise. This technique also reduces power requirements for the plasma elements. To maximize the amount of time the plasma antenna or plasma shields are in the low noise afterglow region, the pulse width in time should be minimized and the time between pulses should be maximized. During the pulse, the electron beam from the electrodes in the plasma tube containing the plasma can transfer energy into waves in the plasma which in time create nonlinearities and noise. Some of these waves are at or near the plasma frequency. Some of these waves are in the range of between 2 KHz to 15 KHz, which are in the range of ion acoustic waves. Much of the noise created by the transfer of energy from the electron beam from the electrode to waves in the plasma can be controlled by controlling the electron beam. In practice the amount of energy from the electron beam feeding these waves can be controlled by chopping the electron beam and creating a pulse.

Other designs that can reduce noise in the plasma include providing electrodes with enough energy spread or energy jitter to reduce the transfer of energy from the electron beam from the electrodes to the waves in the plasma. Still other ways of controlling the noise in the plasma include using plasma antennas or plasma tubes without electrodes for any of the plasma elements. Mechanisms for coupling energy into the plasma if electrodes are not used include capacitive sleeves around the plasma tubes, inductive couplers into the plasma tubes, or remote ionization. Remote ionization can be achieved by lasers, other antennas, acoustics, or other means.

Each of the scanners described above can be mounted within a suitable casing for permitting the antennas to operate as described. It is envisioned as well that the components making up the antennas of each scanner can be embedded within a material having a dielectric constant which approximates air. For example, a synthetic foam including a large volume of air bubbles used to support the antenna elements can have a dielectric constant which approximates that of air. That is, the plasma loops or reconfigurable antenna can be held in place by a rigid, air-filled foam. The foam can further be formed to have external cones, like those used in an electromagnetic anechoic chamber, which reduce reflection. When such a supporting structure is used, the scanner can be fully encased and protected from damage, but still operate normally, as the casing material does not adversely affect the ability of the antennas to function. Other materials having similar properties can be used, while those with different dielectric constants can also be used, but are less preferred due to their adverse affect on signal strength.

While a specific embodiment of the invention has been shown and described in detail to illustrate the application of the principles of the invention, it will be understood that the invention may be embodied otherwise without departing from such principles.

What is claimed is:

1. A reconfigurable scanner for scanning for ID tags containing scannable antennas oriented in multiple directions relative to the scanner, without need for physical movement of the scanner, the reconfigurable scanner comprising:
    a scanning element broadcasting a signal in a selected direction, the scanning element having a plurality of variable conductive elements;
    control means for electrically controlling and changing the selected direction in which the scanning element broadcasts the signal by powering and unpowering the plurality of variable conductive elements; and
    transceiver means for generating an electromagnetic wave and receiving a responsive electromagnetic wave signal from a sensed ID tag within an effective range of the scanner, whereby unpowered variable conductive elements do not cause any interference with the scanning signal.

2. A reconfigurable scanner according to claim 1, wherein the plurality of variable conductive elements are a plurality of plasma loop sensors.

3. A reconfigurable scanner according to claim 2, wherein the plasma loop sensors each comprise a loop antenna having at least a portion of which is an arcuate tube section containing an ionizable gas, such that the loop antenna is only conductive when the ionizable gas is ionized.

4. A reconfigurable scanner according to claim 1, wherein the scanning element comprises an antenna and an electromagnetic shield formed by the plurality of variable conductive elements, the electromagnetic shield intersecting transmission lobes of the antenna in at least the multiple directions being scanned.

5. A reconfigurable scanner according to claim 4, wherein the plurality of variable conductive elements are mounted in an array on a substrate forming the shield.

6. A reconfigurable scanner according to claim 5, wherein the substrate is a conductive metal.

7. A reconfigurable scanner according to claim 4, wherein the electromagnetic shield is formed by stacked layers of arrays of the variable conductive elements.

8. A scanner system comprising:
    a plurality of electromagnetically scannable ID tags; and
    a reconfigurable scanner having a scanning element with a plurality of variable conductive elements switchable between electromagnetically active and electromagnetically invisible, control means for switching the variable conductive elements between electromagnetically active and electromagnetically invisible, and a transceiver means for generating and receiving an electromagnetic scanning signal in a direction determined by the control means, the scanning signal interacting with the scannable ID tags located in the direction of the scanning signal.

9. A scanner system according to claim 8, wherein the variable conductive elements are plasma loop sensors.

10. A scanner system according to claim 8, wherein the scanning element comprises an antenna and an electromagnetic shield formed by the plurality of variable conductive elements, the electromagnetic shield intersecting transmission lobes of the antenna in at least the multiple directions being scanned.

11. A scanner system according to claim 10, wherein the plurality of variable conductive elements are mounted in an array on a substrate forming the shield.

12. A scanner system according to claim 11, wherein the substrate is a conductive metal.

13. A scanner system according to claim 10, wherein the electromagnetic shield is formed by stacked layers of arrays of the variable conductive elements.

14. A scanner system according to claim 8, wherein at least one of the plurality of ID tags comprise an antenna and a code connected with the antenna for detection and reading by the reconfigurable scanner.

15. A scanner system according to claim 14, wherein the at least one ID tag further comprises a power source for powering the antenna into an active state.

16. A scanner system according to claim 15, wherein the power source is external of the ID tag.

17. A scanner system according to claim 14, wherein the antenna of the at least one ID tag is a plasma loop, and the at least one ID tag further comprises a power source for weakly or partially ionizing a plasma in the plasma loop, whereby the plasma loop remains electromagnetically invisible until external energy is received by the plasma.

18. A scanner system according to claim 17, wherein the external energy is provided by the scanning signal.

19. A scanner system for detecting the contents of a shipping container, the system comprising:
    a plurality of slots formed in the shipping container for permitting a selected bandwidth of electromagnetic wave to penetrate the shipping container;
    at least one electromagnetically scannable ID tag associated with the contents of the shipping container; and
    a reconfigurable scanner having a scanning element with a plurality of variable conductive elements switchable between electromagnetically active and electromagnetically invisible, control means for switching the variable conductive elements between electromagnetically active and electromagnetically invisible, and a transceiver means for generating and receiving an electromagnetic scanning signal, the scanning signal having a frequency within the selected bandwidth for penetrating the shipping container to detect the at least one ID tag.

20. A scanner system according to claim 19, wherein the shipping container comprises dielectrics on the interior of the container for damping resonant signals.

21. A scanner system according to claim 19, wherein the slots are formed by dielectric materials.

22. A scanner system according to claim 19, wherein the slots are formed by one of variable dielectric materials surrounded by conductive material and fixed dielectric materials surrounded by variable conductive material.

* * * * *